(12) United States Patent
Zhang et al.

(10) Patent No.: US 11,677,973 B2
(45) Date of Patent: Jun. 13, 2023

(54) MERGE WITH MVD FOR AFFINE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/320,950

(22) Filed: May 14, 2021

(65) Prior Publication Data
US 2021/0274208 A1 Sep. 2, 2021

Related U.S. Application Data

(63) Continuation of application No. PCT/CN2019/118925, filed on Nov. 15, 2019.

(30) Foreign Application Priority Data

Nov. 15, 2018 (WO) ................ PCT/CN2018/115633

(51) Int. Cl.
  *H04N 19/517* (2014.01)
  *H04N 19/132* (2014.01)
  (Continued)

(52) U.S. Cl.
  CPC ......... *H04N 19/517* (2014.11); *H04N 19/132* (2014.11); *H04N 19/176* (2014.11); *H04N 19/184* (2014.11)

(58) Field of Classification Search
  CPC .... H04N 19/176; H04N 19/52; H04N 19/105; H04N 19/70; H04N 19/196;
  (Continued)

(56) References Cited

U.S. PATENT DOCUMENTS 10,448,010 B2   10/2019   Chen et al.
10,560,712 B2   2/2020    Zou et al.
(Continued)

FOREIGN PATENT DOCUMENTS

CN   106537915 A   3/2017
CN   106559669 A   4/2017
(Continued)

OTHER PUBLICATIONS

Chen et al. "Generalized Bi-Prediction for Inter Coding," Joint Video Exploration Team (JVET) of ITU-T SG 16 WP 3 and ISO/IEC JTC 1/SC 29/WG 11, 3rd Meeting, Geneva, CH, May 26-Jun. 1, 2016, document JVET-C0047, 2016.
(Continued)

*Primary Examiner* — Daniel Chang
(74) *Attorney, Agent, or Firm* — Perkins Coie LLP

(57) ABSTRACT

The method relates to harmonization between affine mode and other inter coding tools mode. The method for video processing includes acquiring, during a conversion between a current block and a bitstream representation of the current block, an indication of the current block, where the indication indicates whether a merged affine model of the current block should be modified, and performing, at least based on the indication, the conversion between the current block and the bitstream representation of the current block.

19 Claims, 24 Drawing Sheets

(51) Int. Cl.
*H04N 19/176* (2014.01)
*H04N 19/184* (2014.01)

(58) Field of Classification Search
CPC .. H04N 19/593; H04N 19/157; H04N 19/109; H04N 19/137
See application file for complete search history.

(56) References Cited

U.S. PATENT DOCUMENTS

| | | | |
|---|---|---|---|
| 10,757,417 | B2 | 8/2020 | Zhang et al. |
| 10,778,999 | B2 | 9/2020 | Li et al. |
| 10,841,609 | B1 | 11/2020 | Liu et al. |
| 2010/0208827 | A1 | 8/2010 | Divorra Escoda et al. |
| 2011/0200097 | A1 | 8/2011 | Chen et al. |
| 2015/0268226 | A1* | 9/2015 | Bhargava ............ G01N 33/5091 514/789 |
| 2017/0332095 | A1* | 11/2017 | Zou .................. H04N 19/537 |
| 2017/0337682 | A1* | 11/2017 | Liao .................. A61B 5/7267 |
| 2018/0098063 | A1 | 4/2018 | Chen et al. |
| 2018/0332298 | A1* | 11/2018 | Liu .................... H04N 19/70 |
| 2019/0028731 | A1* | 1/2019 | Chuang ............. H04N 19/159 |
| 2019/0043219 | A1* | 2/2019 | Tezaur ............. H04N 5/23238 |
| 2019/0116376 | A1* | 4/2019 | Chen ................. H04N 19/70 |
| 2019/0335191 | A1* | 10/2019 | Kondo .............. H04N 19/85 |
| 2019/0364295 | A1* | 11/2019 | Li .................... H04N 19/54 |
| 2019/0387250 | A1 | 12/2019 | Boyce et al. |
| 2020/0007877 | A1* | 1/2020 | Zhou ................. H04N 19/426 |
| 2020/0014931 | A1* | 1/2020 | Hsiao ................ H04N 19/517 |
| 2020/0021814 | A1* | 1/2020 | Xu ................... H04N 19/159 |
| 2020/0021840 | A1* | 1/2020 | Xu ................... H04N 19/44 |
| 2020/0045310 | A1 | 2/2020 | Chen et al. |
| 2020/0059651 | A1* | 2/2020 | Lin .................. H04N 19/52 |
| 2020/0145688 | A1* | 5/2020 | Zou .................. H04N 19/567 |
| 2020/0177877 | A1* | 6/2020 | Chen ................. H04N 19/54 |
| 2020/0213594 | A1 | 7/2020 | Liu et al. |
| 2020/0213612 | A1 | 7/2020 | Liu et al. |
| 2020/0382771 | A1 | 12/2020 | Liu et al. |
| 2020/0382795 | A1 | 12/2020 | Zhang et al. |
| 2020/0396453 | A1 | 12/2020 | Zhang et al. |
| 2020/0396465 | A1 | 12/2020 | Zhang et al. |

FOREIGN PATENT DOCUMENTS

| | | | |
|---|---|---|---|
| CN | 108605137 A | 9/2018 | |
| WO | 2010151334 A1 | 12/2010 | |
| WO | 2017118409 A1 | 7/2017 | |
| WO | 2017157259 A1 | 9/2017 | |
| WO | 2017200771 A1 | 11/2017 | |
| WO | 2017205700 A1 | 11/2017 | |
| WO | 2018065153 A1 | 4/2018 | |
| WO | WO-2018128380 A1 * | 7/2018 | ........... H04N 19/109 |
| WO | 2018175520 A1 | 9/2018 | |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0186, 2018.
Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.
Chen et al. "CE4: Affine Merge Enhancement (Test 4.2.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.
He et al. "CE4.1.7: Shape Dependent Control Point Selection for Affine Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0258, 2018.
He et al. "CE4-Related: Encoder Speed-Up and Bug Fix for Generalized Bi-Prediction in BMS-2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0296, 2018.
Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.
Jeong et al. "CE4 Ulitmate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.
Laroche et al. "CE4-Related: On Affine Mode Restriction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0193, 2018.
Li et al. "CE4-Related: Affine Merge Mode with Prediction Offsets," Joint Video Experts Team (JVET) of ITU-T SG 16 WP 3 and ISO/IEC JTC 1/SC 29/WG 11,12th Meeting, Macao, CN, Oct. 3-12, 2018, document JVET-L0320, 2018.
Liao et al. "CE10.3.1 b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.
Su et al. "CE4-Related: Generalized Bi-Prediction Improvements," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0197, 2018.
Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.
Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11 11th Meeting, Ljubljana, Jul. 10-18, 2018, document JVET-K1024, 2018.
Yang et al. "CE4-Related: Control Point MV Offset for Affine Merge Mode," Joint Video Experts Team (JVET) of ITU-T SG 16 WP 3 and ISO/IEC JTC 1/SC 29/WG 11, 12th Meeting, Macao, CN Oct. 3-12, 2018, document JVET-L0389, 2018.
Zhang et al. "CE4: History-based Motion Vector Prediction (Test 4.4.7)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0266, 2018.
Zhang et al. "CE10: Interweaved Prediction for Affine Motion Compensation (Test 10.5.1 and Test 10.5.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0269, 2018.
Zhang et al. "CE4-Related: Affine Model Inheritance from Single-Line Motion Vectors," Joint Video Experts Team (JVET) of ITU-T SG 16 WP 3 and ISO/IEC JTC 1/SC 29/WG 11, 12th Meeting, CN, Oct. 3-12, 2018, document JVET-L0330, 2018.
https://www.itu.int/rec/T-REC-H.265.
JEM-7.0: https://jvet.hhi.fraunhofer.de/svn/svn_HMJEMSoftware/tags/ HM-16.6-JEM-7.0.

(56) References Cited

OTHER PUBLICATIONS

VTM-2.0.1: https://vcgit.hhi.fraunhofer.de/jvet/VVCSoftware_VTM/tags/VTM-2.0.1.

International Search Report and Written Opinion from International Patent Application No. PCT/CN2019/118925 dated Feb. 6, 2020 (10 pages).

International Search Report and Written Opinion from International Patent Application No. PCT/CN2019/118927 dated Jan. 31, 2020 (11 pages).

Office Action from Chinese Patent Application No. 201980075595.8 dated Mar. 23, 2023.

\* cited by examiner

MERGE WITH MVD FOR AFFINE

CROSS REFERENCE TO RELATED APPLICATIONS

This application is a continuation of International Patent Application No. PCT/CN2019/118925, filed on Nov. 15, 2019, which claims the priority to and benefits of International Patent Application No. PCT/CN2018/115633, filed on Nov. 15, 2018. All the aforementioned patent applications are hereby incorporated by reference in their entireties.

TECHNICAL FIELD

This patent document relates to video coding and decoding techniques, devices, and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to the harmonization of affine prediction with other coding tools are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes generating, based on a signaled parameter in a bitstream representation of a current video block, a modified merged affine model by modifying a merged affine model, and reconstructing, based on the modified merged affine model, the current video block.

In another representative aspect, the disclosed technology may be used to provide a method for video processing. This method includes determining that a current video block is coded with a sub-block coding tool, and reconstructing, based on the determining, the current video block using an inter-intra prediction.

In yet another representative aspect, the disclosed technology may be used to provide a method for video processing. This method includes generating, for a current video block, a first prediction, generating, for the current video block, a second prediction, and reconstructing, based on a weighted sum of the first prediction and the second prediction, the current video block.

In one representative aspect, the disclosed technology may be used to provide a method for video processing, comprising: determining a current block; and performing a conversion between the current block and a bitstream representation of the current block by using an inter-intra prediction and at least one of a sub-block coding technology and merge mode with motion vector difference (MMVD) technology.

In one representative aspect, the disclosed technology may be used to provide a method for video processing, comprising: determining multiple weighting values for corresponding positions of a current block according a split of the current block, wherein at least one partition split from the current block is a non-rectangular and non-square partition; determining prediction result of the at least one partition by at least using at least one sub-block merge candidate; and performing a conversion between the current block and a bitstream representation of the current block by using the prediction result.

In one representative aspect, the disclosed technology may be used to provide a method method for video processing, comprising: determining multiple partitions for a current block, wherein at least one partition of the multiple partitions is a non-rectangular and non-square partition; determining a first prediction by using an intra-prediction; determining a second prediction by using an inter-prediction; determining a prediction result according to the first prediction and the second prediction, and performing a conversion between the current block and a bitstream representation of the current block by using the prediction result.

In one representative aspect, the disclosed technology may be used to provide a method method for video processing, comprising: acquiring, during a conversion between a current block and a bitstream representation of the current block, an indication of the current block, wherein the indication indicates whether a merged affine model of the current block should be modified; and performing, at least based on the indication, the conversion between the current block and the bitstream representation of the current block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 9 shows an example of motion vector storage.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Figure 1:
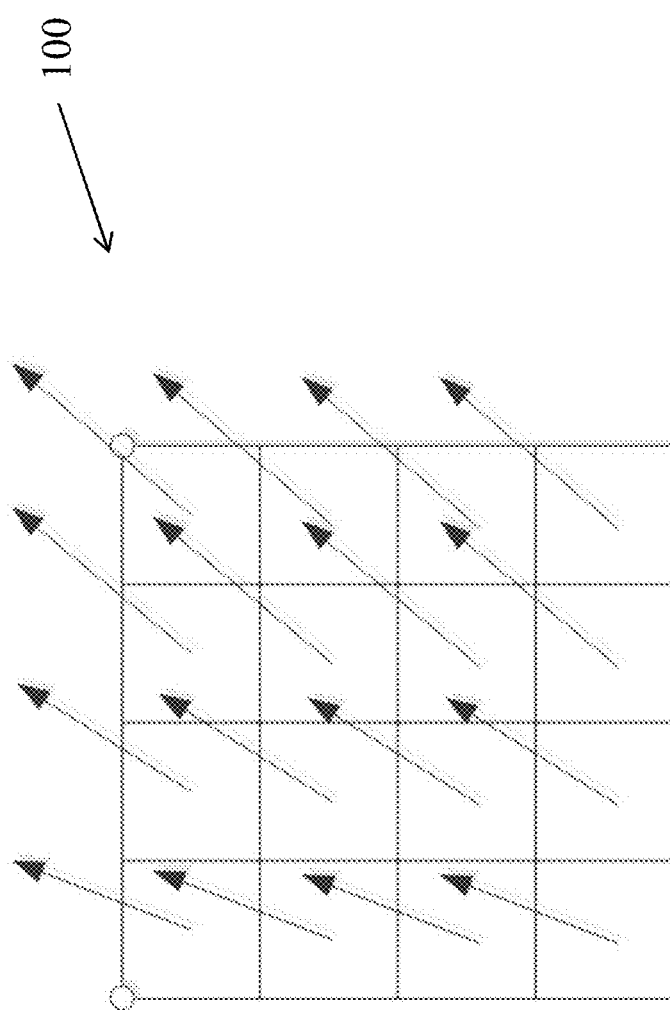
FIG. 1 shows an example of sub-block based prediction.

Sub-block based prediction is first introduced into the video coding standard by the High Efficiency Video Coding (HEVC) standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Examples of the Joint Exploration Model (JEM)

In some embodiments, future video coding technologies are explored using a reference software known as the Joint Exploration Model (JEM. In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC). Affine prediction has also been adopted into VVC.

1.1 Examples of Affine Prediction

Figure 2A:
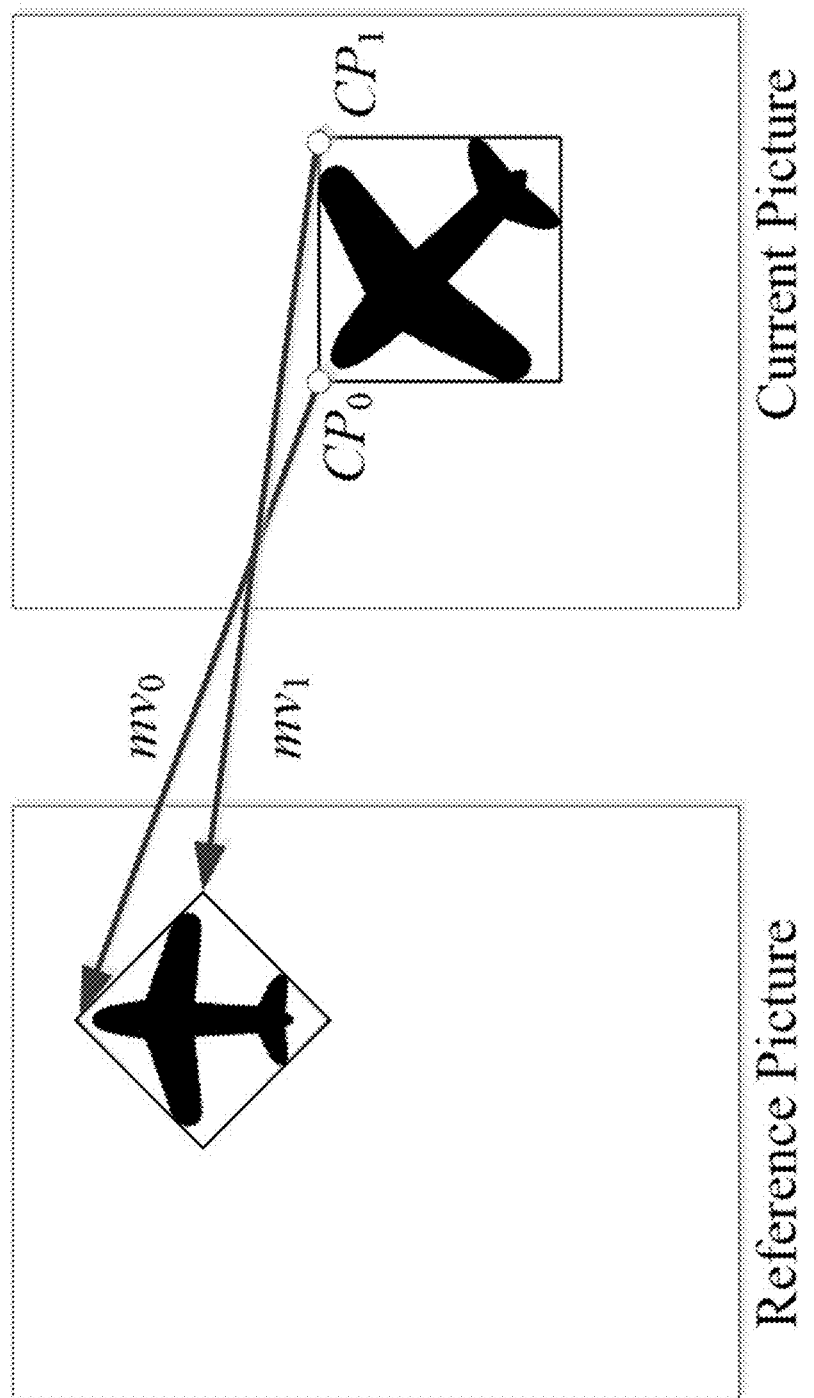
FIGS. 2A and 2B show examples of the simplified 4-parameter affine model and the simplified 6-parameter affine model, respectively.
Figure 2B:
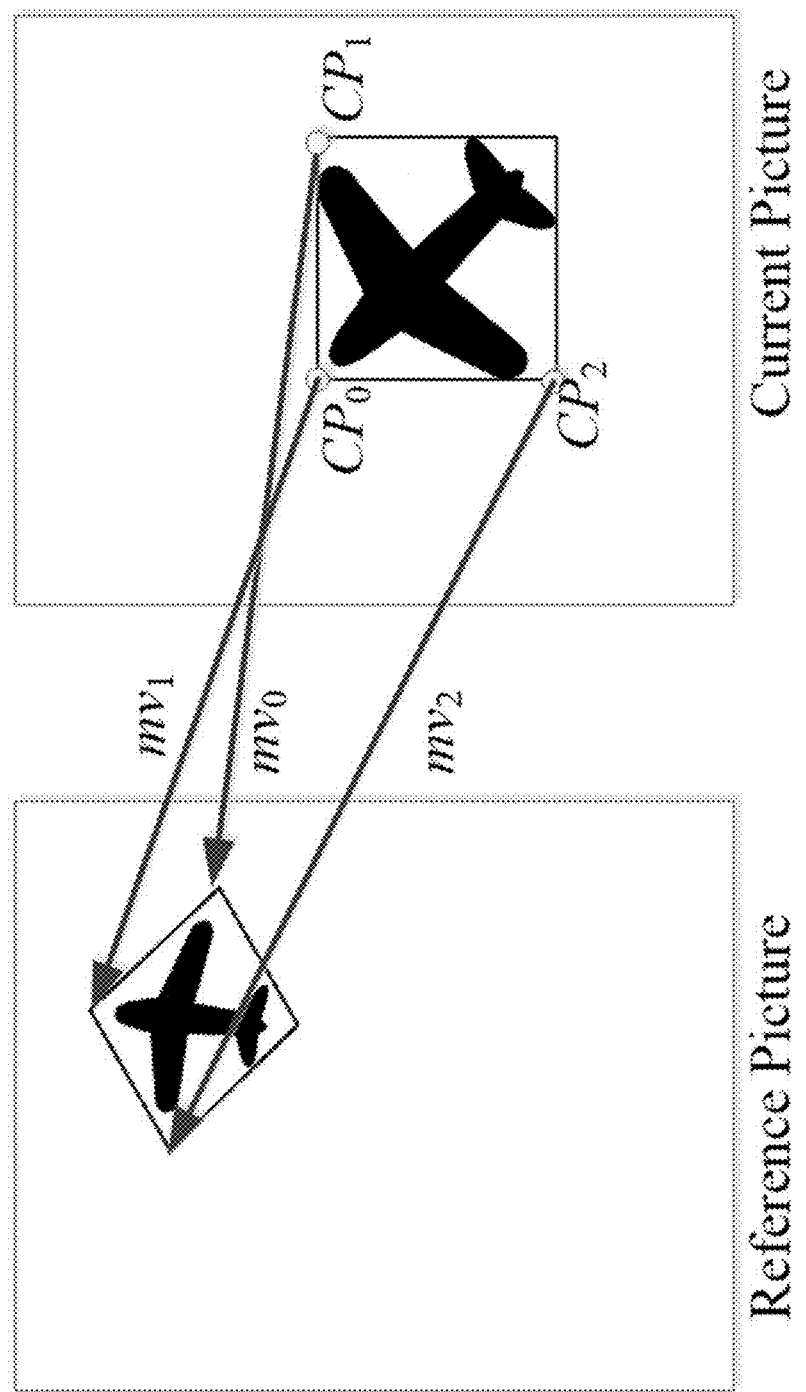

In HEVC, only a translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIGS. 2A and 2B, the affine motion field of the block is described by two (in the 4-parameter affine model) or three (in the 6-parameter affine model) control point motion vectors, respectively.

The motion vector field (MVF) of a block is described by the following equation with the 4-parameter affine model and 6-parameter affine model respectively:

$$\begin{cases} mv^h(x, y) = ax - by + c = \frac{(mv_1^h - mv_0^h)}{w}x - \frac{(mv_1^v - mv_0^v)}{w}y + mv_0^h \\ mv^v(x, y) = bx + ay + d = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, Equations (1) and (2) are implemented as:

$$\begin{cases} iDMvHorX = (mv_1^h - mv_0^h) \ll (S - \log 2(w)) \\ iDMvHorY = (mv_1^v - mv_0^v) \ll (S - \log 2(w)) \end{cases} \quad \text{Eq. (3)}$$

For the 4-parameter affine model shown in Equation (1):

$$\begin{cases} iDMvVerX = -iDMvHorY \\ iDMvVerY = iDMvHorX \end{cases} \quad \text{Eq. (4)}$$

For the 6-parameter affine model shown in Equation (2):

$$\begin{cases} iDMvVerX = (mv_2^h - mv_0^h) \ll (S - \log 2(h)) \\ iDMvVerY = (mv_2^v - mv_0^v) \ll (S - \log 2(h)) \end{cases} \quad \text{Eq. (5)}$$

And thus, the motion vectors may be derived as:

$$\begin{cases} mv^h(x, y) = \text{Normalize}\,(iDMvHorX \cdot x + iDMvVerX \cdot y + (mv_0^h \ll S), S) \\ mv^v(x, y) = \text{Normalize}\,(iDMvHorY \cdot x + iDMvVerY \cdot y + (mv_0^v \ll S), S) \end{cases}$$  Eq. (6)

$$\text{Normalize}\,(Z, S) = \begin{cases} (Z + \text{Off}) \gg S & \text{if } Z \geq 0 \\ -((Z + \text{Off}) \gg S) & \text{Otherwise} \end{cases}$$  Eq. (7)

$$\text{Off} = 1 \ll (S - 1)$$

Herein, S represents the calculation precision. e.g. in VVC, S=7. In VVC, the MV used in MC for a sub-block with the top-left sample at (xs, ys) is calculated by Equation (6) with x=xs+2 and y=ys+2.

Figure 3:
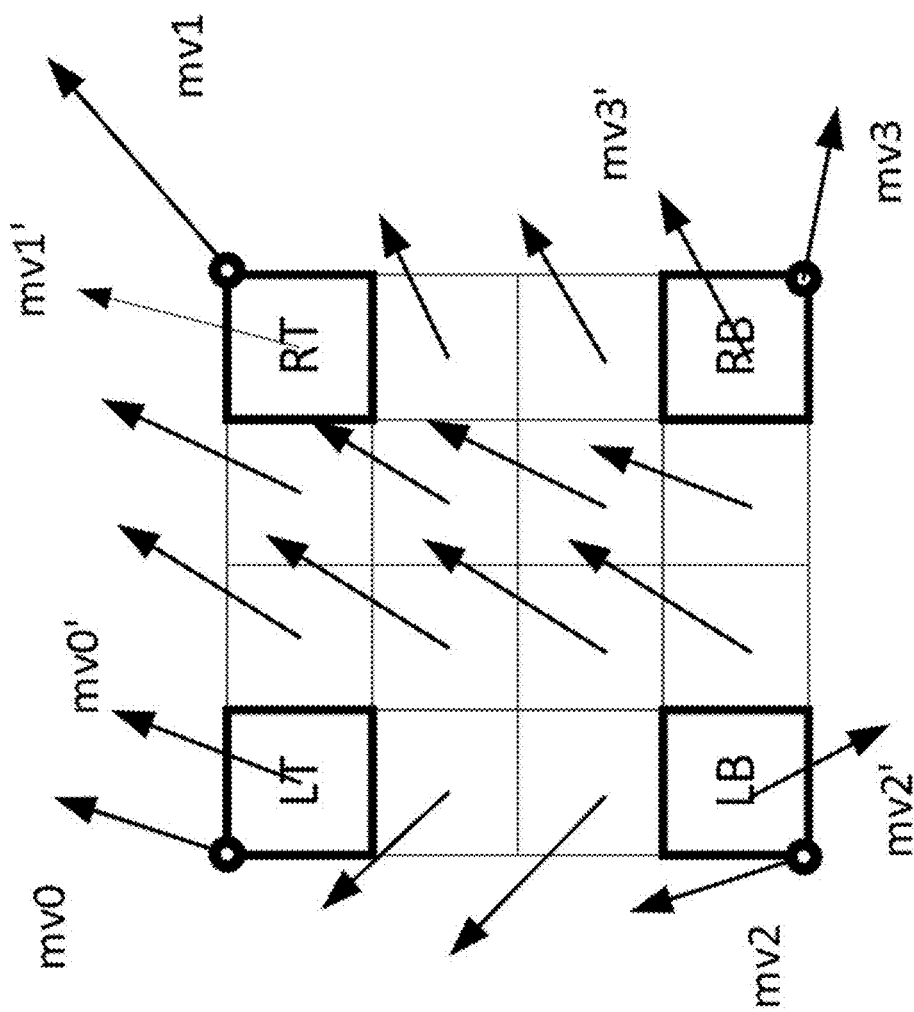
FIG. 3 shows an example of an affine motion vector field (MVF) per sub-block.

To derive motion vector of each 4×4 sub-block, the motion vector of the center sample of each sub-block, as shown in FIG. 3, is calculated according to Equations (1) or (2), and rounded to 1/16 fraction accuracy. Then the motion compensation interpolation filters are applied to generate the prediction of each sub-block with derived motion vector.

Figure 4A:
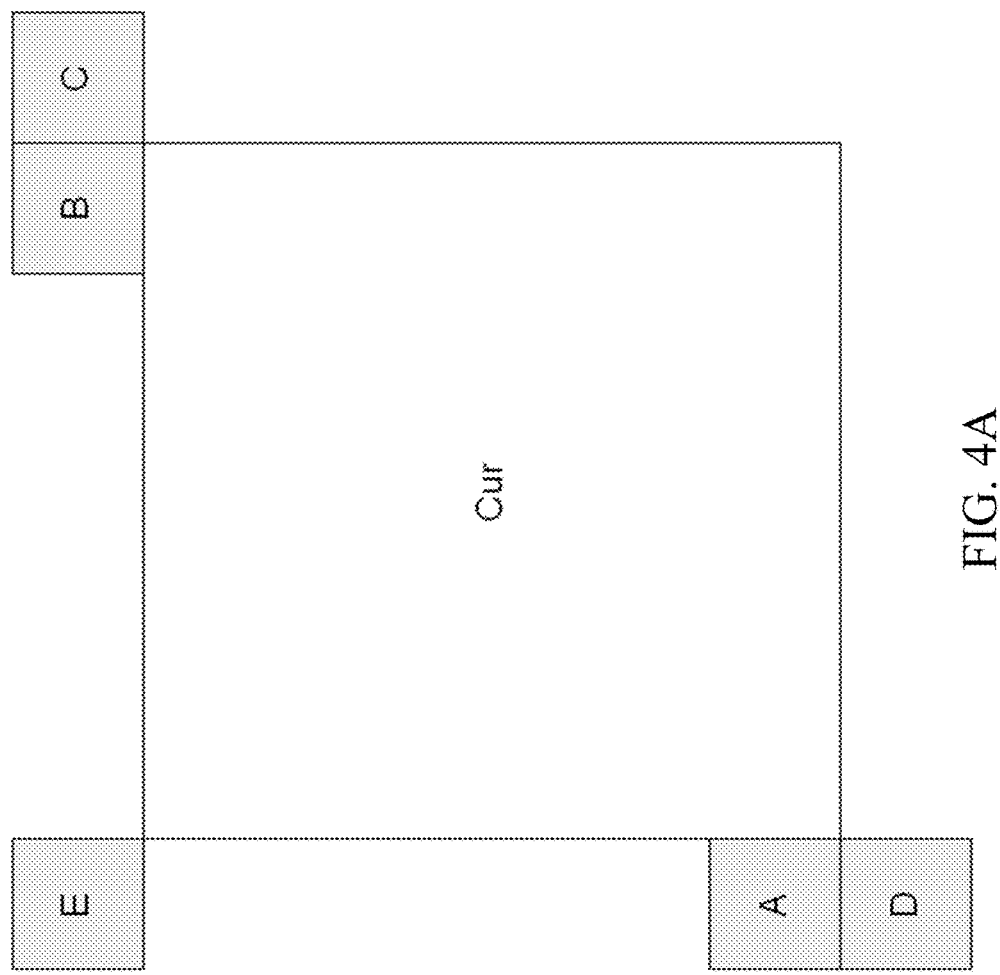
FIGS. 4A and 4B show example candidates for the AF_MERGE affine motion mode.
Figure 4B:
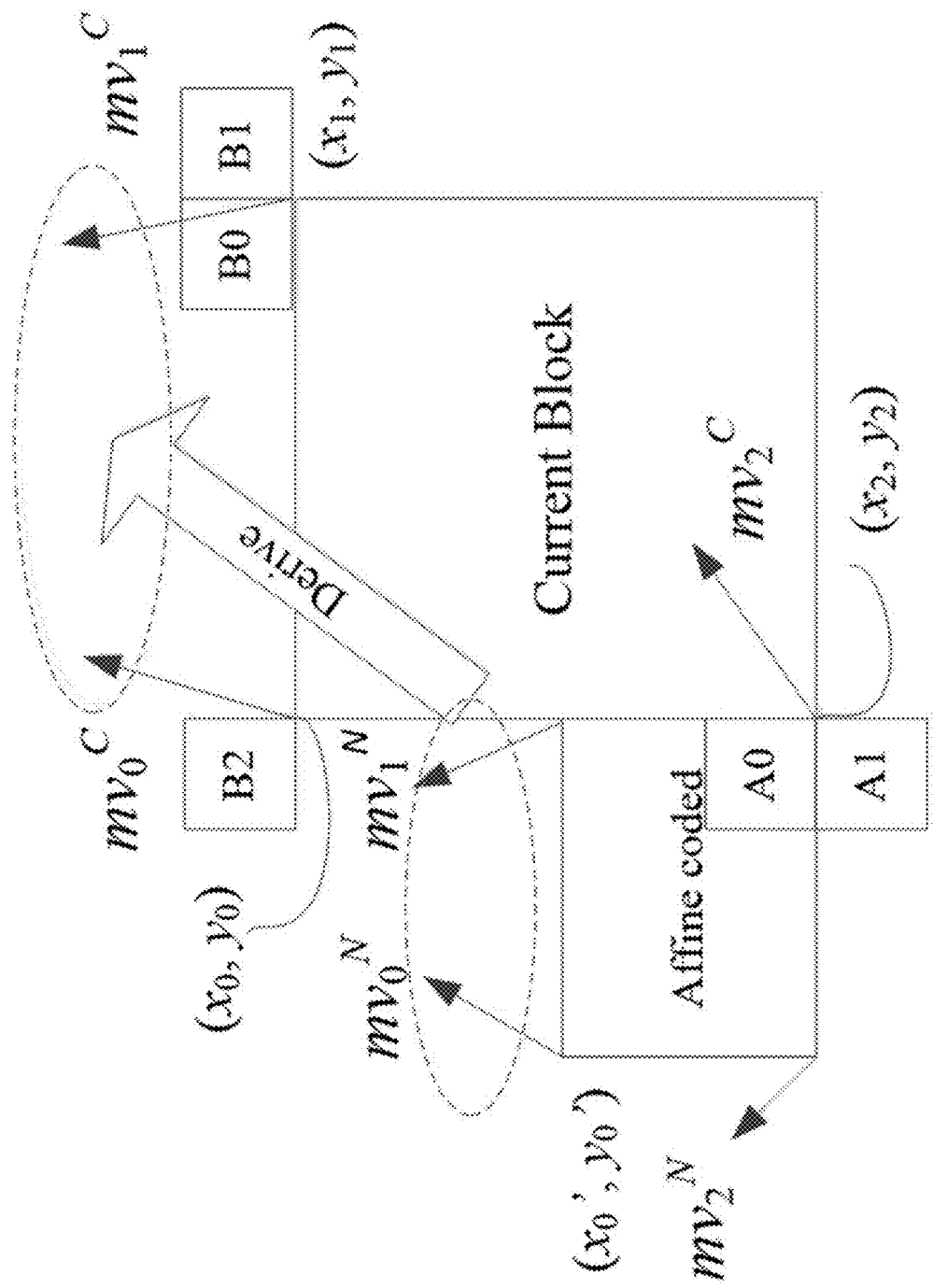

Affine model can be inherited from spatial neighbouring affine-coded block such as left, above, above right, left bottom and above left neighbouring block as shown in FIG. 4A. For example, if the neighbour left bottom block A in FIG. 4A is coded in affine mode as denoted by A0 in FIG. 4B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$.

In some embodiments, sub-block (e.g. 4×4 block in VTM) LT stores mv0, RT stores mv1 if the current block is affine coded. If the current block is coded with the 6-parameter affine model, LB stores mv2; otherwise (with the 4-parameter affine model), LB stores mv2'. Other sub-blocks stores the MVs used for MC.

In some embodiments, when a CU is coded with affine merge mode, e.g., in AF_MERGE mode, it gets the first block coded with affine mode from the valid neighbour reconstructed blocks. And the selection order for the candidate block is from left, above, above right, left bottom to above left as shown in FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

2 Exemplary Embodiments

Different from VTM wherein only one affine spatial neighboring block may be used to derive affine motion for a block, in some exemplary embodiments, it proposes to construct a separate list of affine candidates for the AF_MERGE mode.

(1) Insert Inherited Affine Candidates into Candidate List

In an example, inherited affine candidate means that the candidate is derived from the valid neighbor reconstructed block coded with affine mode.

Figure 5:
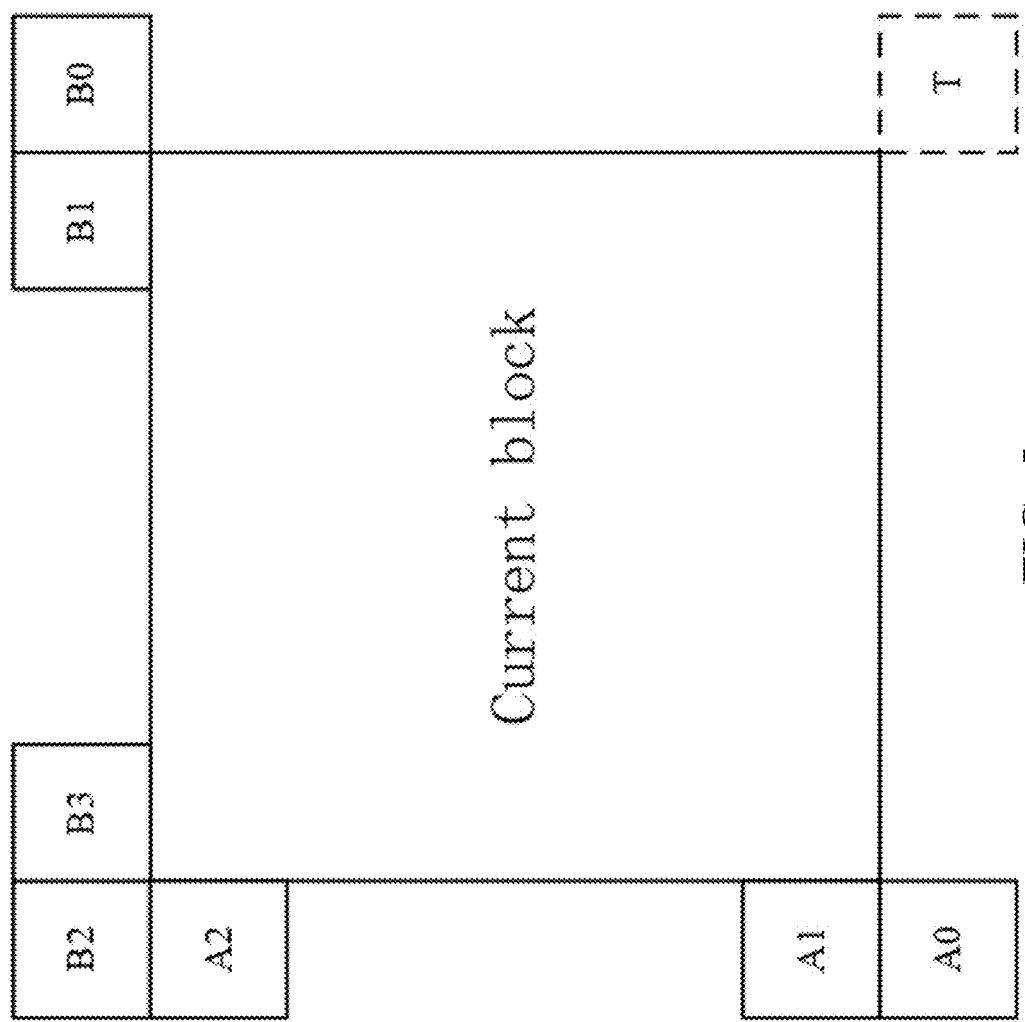
FIG. 5 shows an example of candidate positions for affine merge mode.

As shown in FIG. 5, the scan order for the candidate block is $A_1$, $B_1$, $B_0$, $A_0$ and $B_2$. When a block is selected (e.g., $A_1$), the two-step procedure is applied:

(a) Firstly, use the three corner motion vectors of the CU covering the block to derive two/three control points of current block; and (b) Based on the control points of current block to derive sub-block motion for each sub-block within current block.

(2) Insert Constructed Affine Candidates

In some embodiments, if the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0;
For CP3, the checking priority is A1→A0;
For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

(3) Insert Zero Motion Vectors

If the number of candidates in affine merge candidate list is less than MaxNumAffineCand, zero motion vectors are insert into the candidate list, until the list is full.

3 Exemplary Embodiments of Affine Merge Candidate Lists

3.1 Embodiments

In the affine merge mode, only the first available affine neighbour can be used to derive motion information of affine merge mode. In some embodiments, a candidate list for affine merge mode is constructed by searching valid affine neighbours and combining the neighbor motion information of each control point.

The affine merge candidate list is constructed as following steps:

(1) Insert Inherited Affine Candidates

Inherited affine candidate means that the candidate is derived from the affine motion model of its valid neighbor affine coded block. In the common base, as shown in FIG. 5, the scan order for the candidate positions is: A1, B1, B0, A0 and B2.

After a candidate is derived, full pruning process is performed to check whether same candidate has been inserted into the list. If a same candidate exists, the derived candidate is discarded.

(2) Insert Constructed Affine Candidates

If the number of candidates in affine merge candidate list is less than MaxNumAffineCand (set to 5 in this example), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0;

For CP3, the checking priority is A1→A0;

For CP4, T is used.

Secondly, the combinations of controls points are used to construct the motion model.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

(3) Padding with Zero Motion Vectors

If the number of candidates in affine merge candidate list is less than 5, zero motion vectors with zero reference indices are insert into the candidate list, until the list is full.

3.2 Embodiments of Affine Merge Mode

In an existing implementation, it is proposed that the following simplifications for the affine merge mode:

(1) The pruning process for inherited affine candidates is simplified by comparing the coding units covering the neighboring positions, instead of comparing the derived affine candidates. Up to 2 inherited affine candidates are inserted into affine merge list. The pruning process for constructed affine candidates is totally removed.

(2) The MV scaling operation in constructed affine candidate is removed. If the reference indices of control points are different, the constructed motion model is discarded.

(3) The number of constructed affine candidates is reduced from 10 to 6.

(4) It is also proposed that other merge candidates with sub-block prediction such as ATMVP is also put into the affine merge candidate list. In that case, the affine merge candidate list may be renamed with some other names such as sub-block merge candidate list.

4 Examples of Control Point Motion Vector (CPMV) Offset

New Affine merge candidates are generated based on the CPMVs offsets of the first Affine merge candidate. If the first Affine merge candidate enables 4-parameter Affine model, then 2 CPMVs for each new Affine merge candidate are derived by offsetting 2 CPMVs of the first Affine merge candidate; Otherwise (6-parameter Affine model enabled), then 3 CPMVs for each new Affine merge candidate are derived by offsetting 3 CPMVs of the first Affine merge candidate. In Uni-prediction, the CPMV offsets are applied to the CPMVs of the first candidate. In Bi-prediction with List 0 and List 1 on the same direction, the CPMV offsets are applied to the first candidate as follows:

$$MV_{new(L0),i} = MV_{old(L0)} + MV_{offset(i)}$$

$$MV_{new(L1),i} = MV_{old(L1)} + MV_{offset(i)}$$

In Bi-prediction with List 0 and List 1 on the opposite direction, the CPMV offsets are applied to the first candidate as follows:

$$MV_{new(L0),i} = MV_{old(L0)} + MV_{offset(i)}$$

$$MV_{new(L1),i} = MV_{old(L1)} - MV_{offset(i)}$$

In this embodiment, various offset directions with various offset magnitudes are used to generate new Affine merge candidates. Two implementations were tested:

(1) 16 new Affine merge candidates with 8 different offset directions with 2 different offset magnitudes are generated as shown in the following offsets set:

Offset set={(4, 0), (0, 4), (−4, 0), (0, −4), (−4, −4), (4, −4), (4, 4), (−4, 4), (8, 0), (0, 8), (−8, 0), (0, −8), (−8, −8), (8, −8), (8, 8), (−8, 8)}.

The Affine merge list is increased to 20 for this design. The number of potential Affine merge candidates is 31 in total.

(2) 4 new Affine merge candidates with 4 different offset directions with 1 offset magnitude are generated as shown in the following offsets set:

Offset set={(4,0),(0,4),(−4,0),(0,−4)}.

The Affine merge list is kept to 5. Four temporal constructed Affine merge candidates are removed to keep the number of potential Affine merge candidates unchanged, i.e., 15 in total. Suppose the coordinates of CPMV1, CPMV2, CPMV3 and CPMV4 are (0, 0), (W, 0), (H, 0) and (W, H). Note that CPMV4 is derived from the temporal MV as shown in FIG. 5. The removed candidates are the following four temporal-related constructed Affine merge candidates: {CP2, CP3, CP4}, {CP1, CP4}, {CP2, CP4}, {CP3, CP4}.

5 Examples of Generalized Bi-Prediction Improvement (GBi)

Generalized Bi-prediction improvement (GBi) proposed is adopted in some embodiments.

GBi was proposed in some embodiments. The gain-complexity trade-off for GBi is improved and was adopted in some embodiments. In some embodiments, GBi applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. In some embodiments the predictor generation in bi-prediction mode is shown below.

$$PGB_i = (w_0 * PL0 + w_1 * PL1 + \text{RoundingOffsetGBi}) >> \text{shiftNumGBi},$$

Herein, PGB is the final predictor of GBi. $w_0$ and $w_1$ are the selected GBi weight pair and applied to the predictors of list 0 (L0) and list 1 (L1), respectively. RoundingOffsetGBi and shiftNumGBi are used to normalize the final predictor in GBi. The supported $w_1$ weight set is {−¼, ⅜, ½, ⅝, 5/4}, in which the five weights correspond to one equal weight pair and four unequal weight pairs. The blending gain, i.e., sum of $w_1$ and $w_0$, is fixed to 1.0. Therefore, the corresponding $w_0$ weight set is {5/4, ⅝, ½, ⅜, −¼}. The weight pair selection is at CU-level.

For non-low delay pictures, the weight set size is reduced from five to three, where the $w_1$ weight set is {⅜, ½, ⅝} and the $w_0$ weight set is {⅝, ½, ⅜}. The weight set size reduction for non-low delay pictures is applied to the BMS2.1 GBi and all the GBi tests in this contribution.

In this embodiment, one combined solution is proposed to further improve the GBi performance. Specifically, the following modifications are applied on top of the existing GBi design.

GBi encoder bug fix. To reduce the GBi encoding time, in current encoder design, the encoder will store uni-prediction motion vectors estimated from GBi weight equal to 4/8, and reuse them for uni-prediction search of other GBi weights. This fast encoding method is applied to both translation motion model and affine motion model. In some embodiments, 6-parameter affine model was adopted together with 4-parameter affine model. The BMS2.1 encoder does not differentiate 4-parameter affine model and 6-parameter affine model when it stores the uni-prediction affine MVs when GBi weight is equal to 4/8. Consequently, 4-parameter affine MVs may be overwritten by 6-parameter affine MVs after the encoding with GBi weight 4/8. The stored 6-parameter affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to 4/8, and reuse the corresponding affine MVs based on the affine model type for other GBi weights.

CU size constraint for GBi. In this method, GBi is disabled for small CUs. In inter prediction mode, if bi-prediction is used and the CU area is smaller than 128 luma samples, GBi is disabled without any signaling.

Merge mode with GBi. With Merge mode, GBi index is not signaled. Instead it is inherited from the neighboring block it is merged to. When TMVP candidate is selected, GBi is turned off in this block.

Affine prediction with GBi. When the current block is coded with affine prediction, GBi can be used. For affine inter mode, GBi index is signaled. For Affine merge mode, GBi index is inherited from the neighboring block it is merged to. If a constructed affine model is selected, GBi is turned off in this block.

6 Examples of Triangular Prediction Mode

Figure 6A:
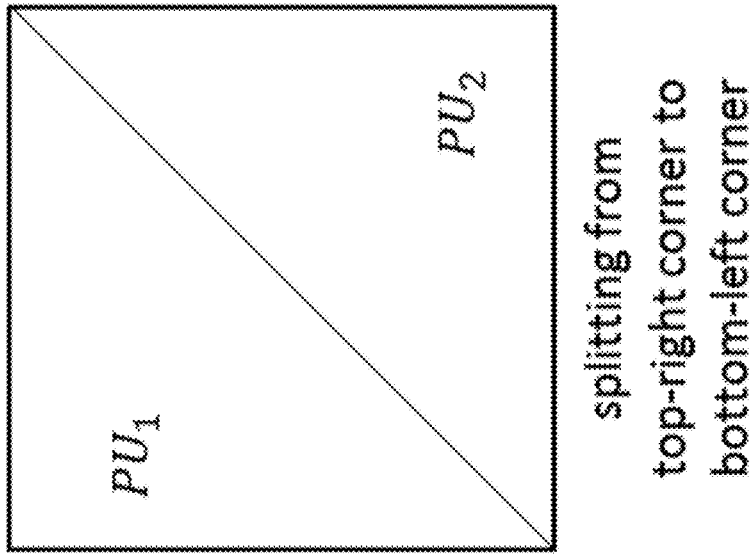
FIGS. 6A and 6B show examples of splitting a coding unit (CU) into two triangular prediction units (PUs).
Figure 6B:
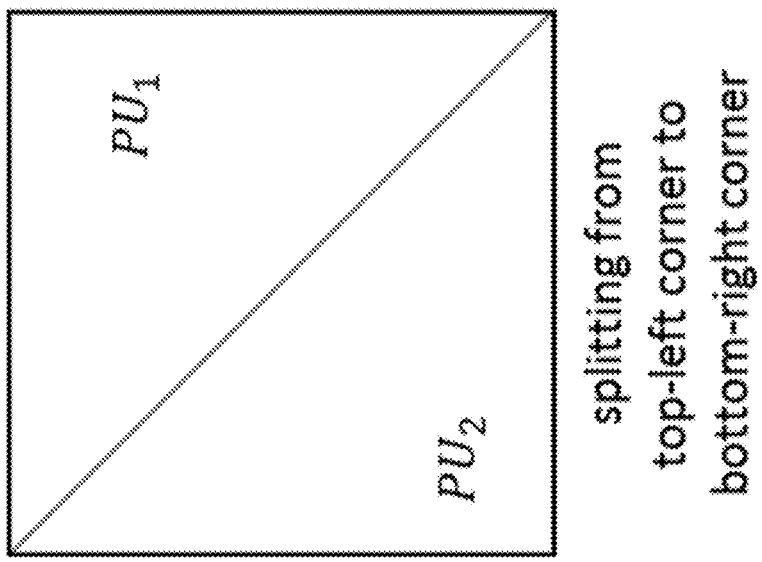

The concept of the triangular prediction unit mode is to introduce a new triangular partition for motion compensated prediction. As shown in FIGS. 6A and 6B, the triangular prediction unit mode splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

6.1 Uni-Prediction Candidate List

Figure 7:
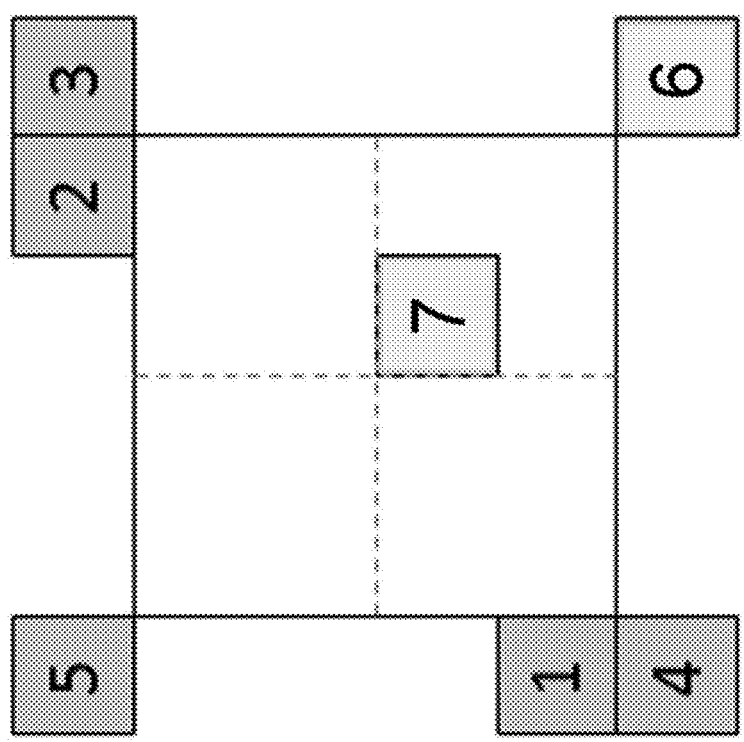
FIG. 7 shows an example of the positions of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 7. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list.

6.2 Adaptive Weighting Process

After predicting each triangular prediction unit, an adaptive weighting process is applied to the diagonal edge between the two triangular prediction units to derive the final prediction for the whole CU. Two weighting factor groups are listed as follows:

1st weighting factor group: {7/8, 6/8, 4/8, 2/8, 1/8} and {7/8, 4/8, 1/8} are used for the luminance and the chrominance samples, respectively; and 2nd weighting factor group: {7/8, 6/8, 5/8, 4/8, 3/8, 2/8, 1/8} and {6/8, 4/8, 2/8} are used for the luminance and the chrominance samples, respectively.

Figure 8:
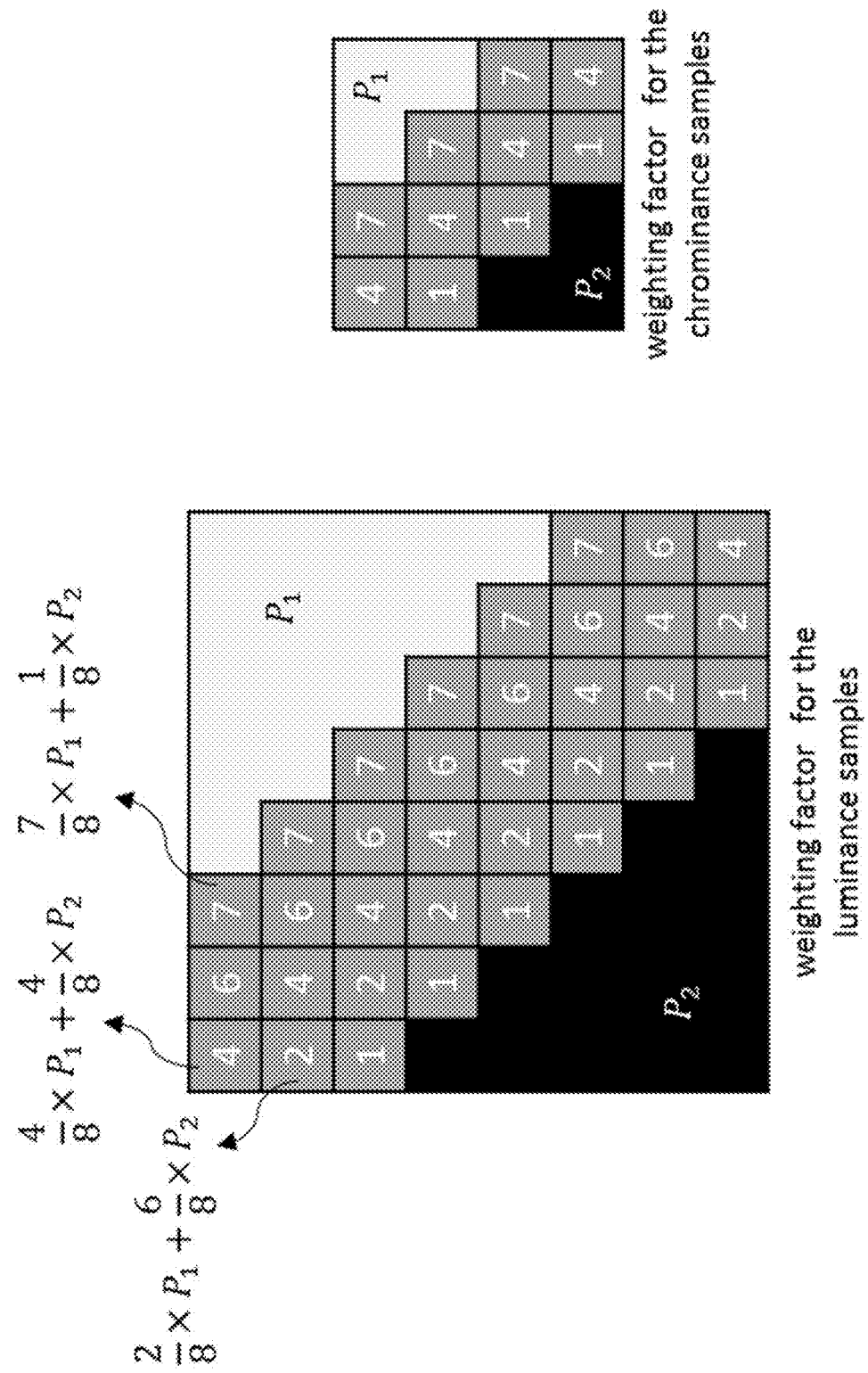
FIG. 8 shows an example of a CU applying the $1^{st}$ weighting factor group.

One weighting factor group is selected based on the comparison of the motion vectors of two triangular prediction units. The 2nd weighting factor group is used when the reference pictures of the two triangular prediction units are different from each other or their motion vector difference is larger than 16 pixels. Otherwise, the 1st weighting factor group is used. FIG. 8 shows an example of this adaptive weighting process.

6.3 Motion Vector Storage

Figure 9:
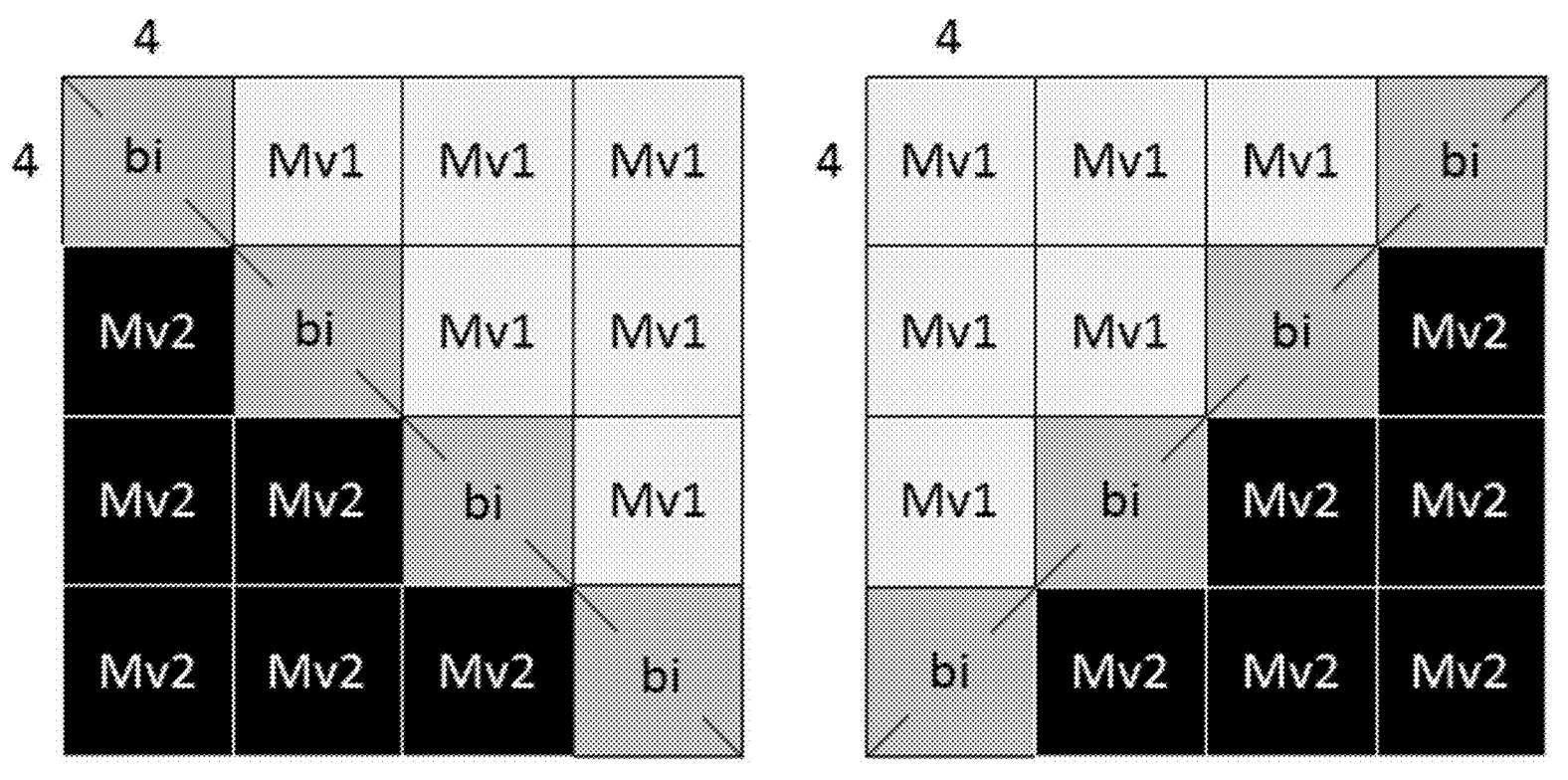

The motion vectors (Mv1 and Mv2 in FIG. 9) of the triangular prediction units are stored in 4×4 grids. For each 4×4 grid, either uni-prediction or bi-prediction motion vector is stored depending on the position of the 4×4 grid in the CU. As shown in FIG. 9, uni-prediction motion vector, either Mv1 or Mv2, is stored for the 4×4 grid located in the non-weighted area. On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.

2) In the case that both Mv1 and Mv2 are from the same L0 (or L1) direction:

2a) If the reference picture of Mv2 is the same as a picture in the L1 (or L0) reference picture list, Mv2 is scaled to the picture. Mv1 and the scaled Mv2 are combined to form the bi-prediction motion vector.

2b) If the reference picture of Mv1 is the same as a picture in the L1 (or L0) reference picture list, Mv1 is scaled to the picture. The scaled Mv1 and Mv2 are combined to form the bi-prediction motion vector.

2c) Otherwise, only Mv1 is stored for the weighted area.

7 Examples of History-Based Motion Vector Prediction (HMVP)

Figure 10:
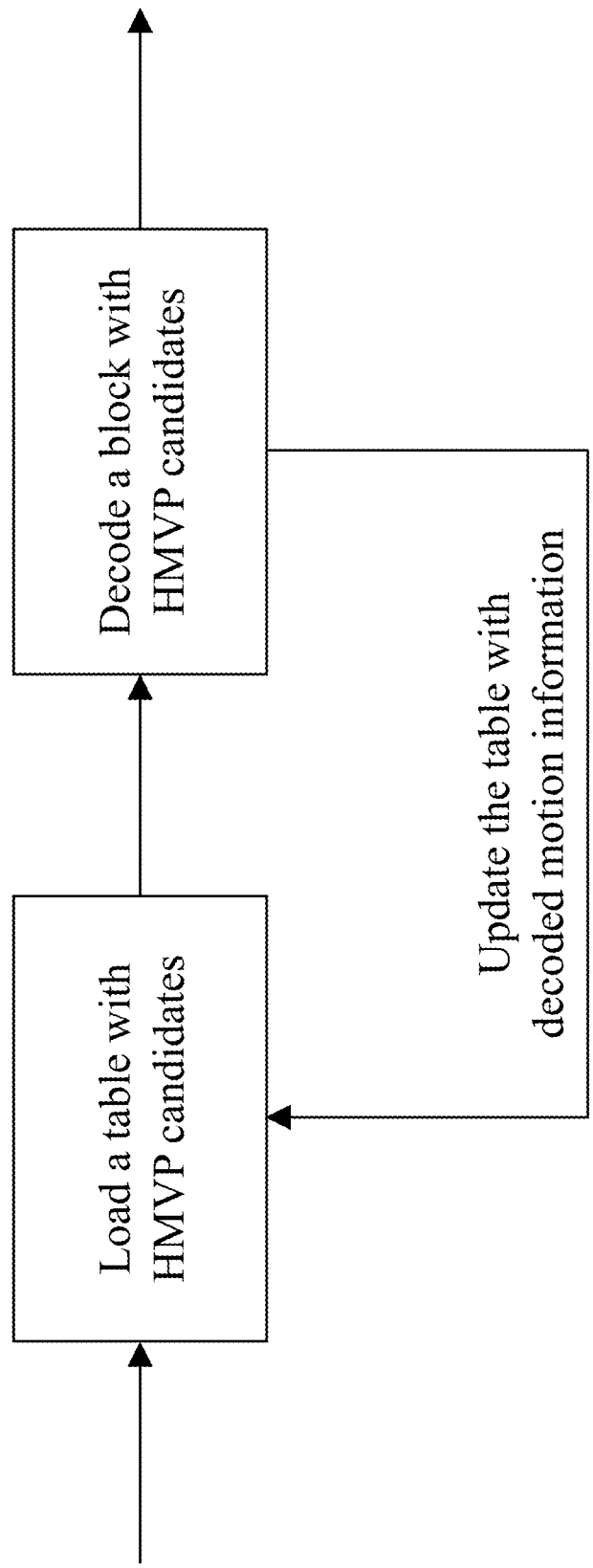
FIG. 10 shows a decoding flow chart for an example history-based motion vector prediction (HMVP) method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The overall coding flow is depicted in FIG. 10.

Figure 11:
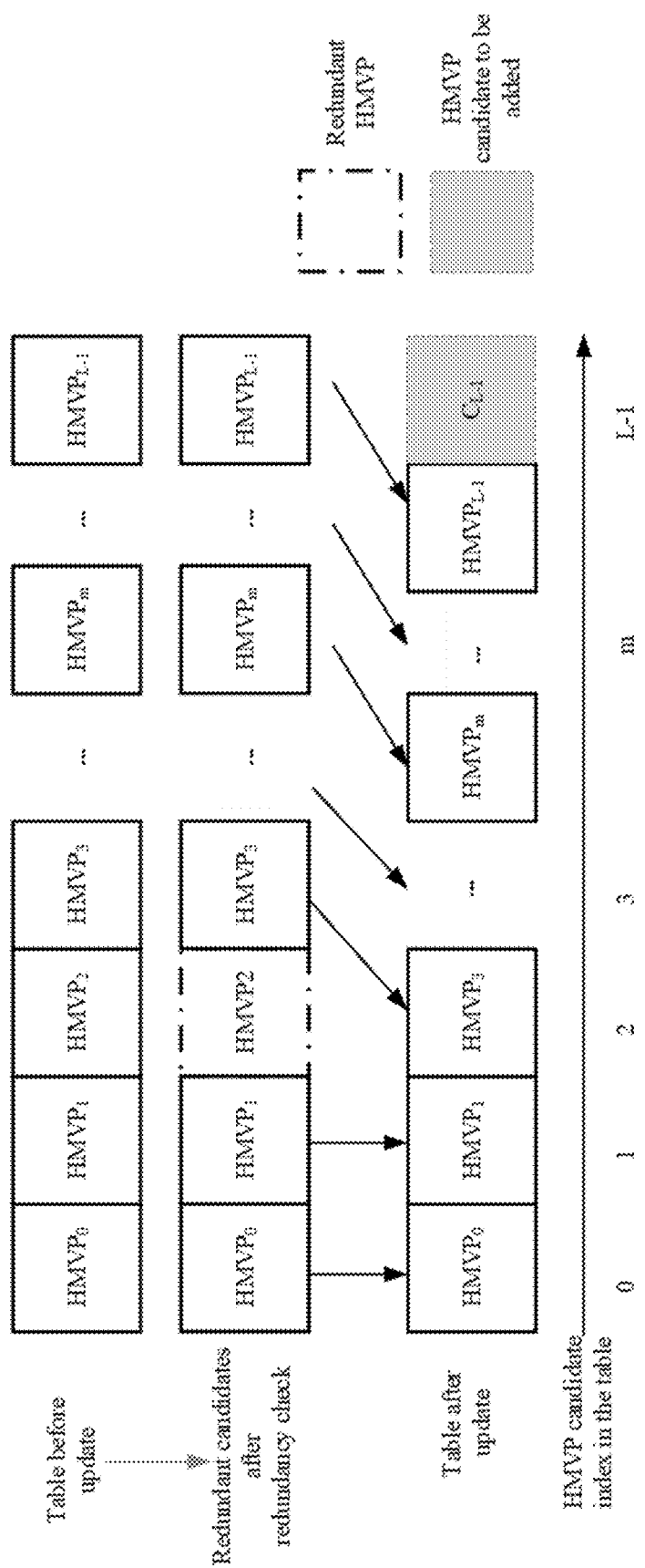
FIG. 11 shows an example of updating a table in the HMVP method.

In this example, the table size S is set to be 6, which indicates up to 6 HMVP candidates may be added to the table. When inserting a new motion candidate to the table (as shown in FIG. 11), a constrained FIFO rule is utilized wherein redundancy check is firstly applied to find whether there is an identical HMVP in the table. If found, the identical HMVP is removed from the table and all the HMVP candidates afterwards are moved forward, i.e., with indices reduced by 1.

HMVP candidates could be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (e.g., ATMVP).

To reduce the number of pruning operations, three simplifications are introduced:

Number of HMPV candidates to be check denoted by L is set as follows:

$$L=(N<=4)?M:(8-N)$$

Herein, N indicates number of available non-sub block merge candidate and M indicates number of available HMVP candidates in the table.

In addition, once the total number of available merge candidates reaches the signaled maximally allowed merge candidates minus 1, the merge candidate list construction process from HMVP list is terminated.

Moreover, the number of pairs for combined bi-predictive merge candidate derivation is reduced from 12 to 6.

Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In this contribution, K is set to 4 while the AMVP list size is kept unchanged, i.e., equal to 2.

8 Examples of Ultimate Motion Vector Expression (UMVE)

In some embodiments, ultimate motion vector expression (UMVE) is presented. UMVE is used for either skip or merge modes with a proposed motion vector expression method.

UMVE re-uses merge candidate as same as using in VVC. Among the merge candidates, a candidate can be selected, and is further expanded by the proposed motion vector expression method. UMVE is also known as Merge with Motion Vector Difference (MMVD).

UMVE provides a new motion vector expression with simplified signaling. The expression method includes starting point, motion magnitude, and motion direction. This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

| Base candidate IDX | 0 | 1 | 2 | 3 |
|---|---|---|---|---|
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

| Distance IDX | 0 | 1 | 2 | 3 | 4 | 5 | 6 | 7 |
|---|---|---|---|---|---|---|---|---|
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below:

| Direction IDX | 00 | 01 | 10 | 11 |
|---|---|---|---|---|
| x-axis | + | − | N/A | N/A |
| y-axis | N/A | N/A | + | − |

Figure 12:
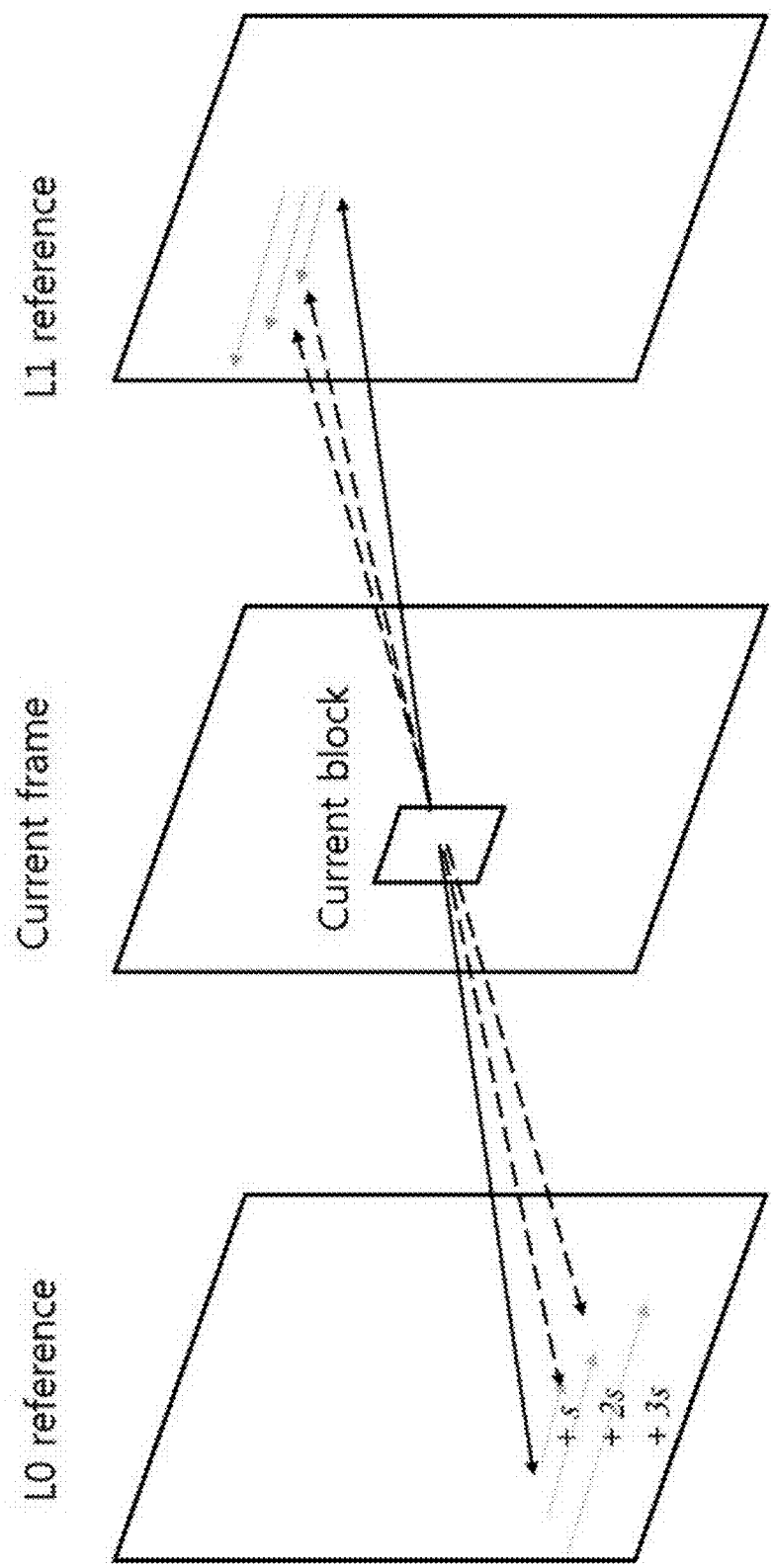
FIG. 12 shows an example of an ultimate motion vector expression (UMVE) search process for a current frame.

FIG. 12 shows an example of an UMVE search process for a current frame.

Figure 13B:
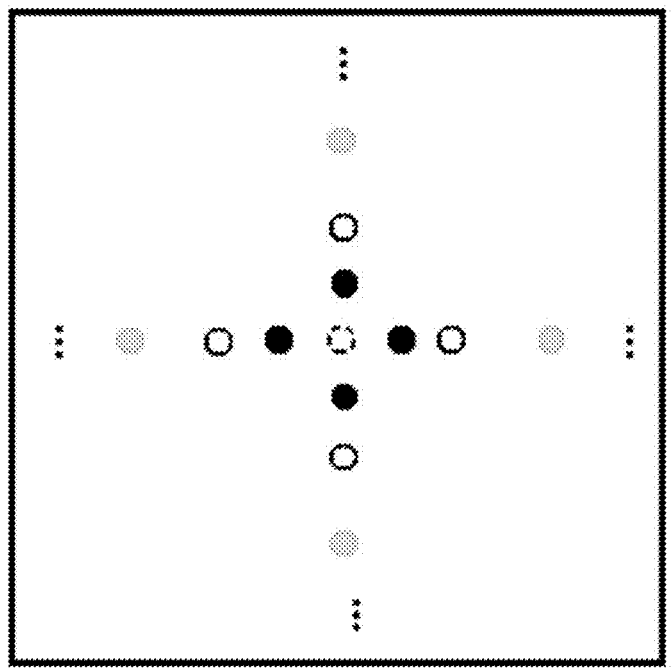
FIGS. 13A and 13B show examples of UMVE search points.
Figure 13A:
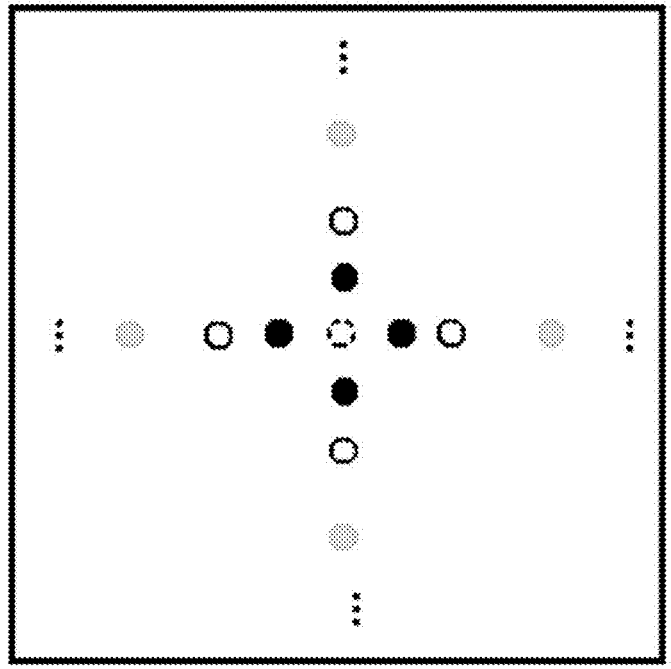

FIGS. 13A and 13B show examples of UMVE search points of reference pictures in reference list 0 and reference list 1, respectively.

UMVE flag is signaled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

9 Examples of Inter-Intra Mode

With inter-intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

10 Examples of Affine Merge Mode with Prediction Offsets

In some embodiments, UMVE is extended to affine merge mode, we will call this UMVE affine mode thereafter. The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

A distance offset table with size of 5 is used as shown in the table below.

| Distance IDX | 0 | 1 | 2 | 3 | 4 |
|---|---|---|---|---|---|
| Distance-offset | ½-pel | 1-pel | 2-pel | 4-pel | 8-pel |

Figure 14:
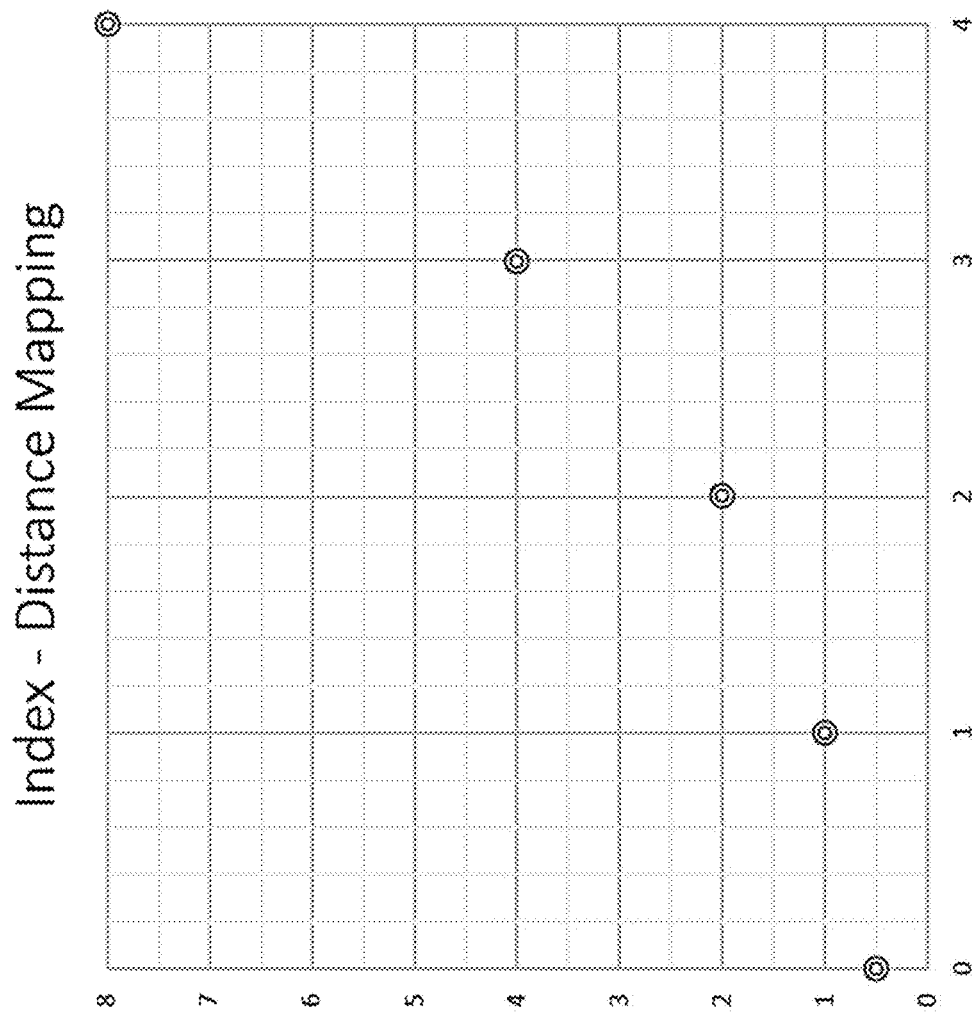
FIG. 14 shows an exemplary mapping between distance index and distance offset.

Distance index is signaled to indicate which distance offset to use. The mapping of distance index and distance offset values is shown in FIG. 14.

The direction index can represent four directions as shown below, where only x or y direction may have an MV difference, but not in both directions.

| Offset Direction IDX | 00 | 01 | 10 | 11 |
|---|---|---|---|---|
| x-dir-factor | +1 | −1 | 0 | 0 |
| y-dir-factor | 0 | 0 | +1 | −1 |

If the inter prediction is uni-directional, the signaled distance offset is applied on the offset direction for each control point predictor. Results will be the MV value of each control point.

For example, when base predictor is uni-directional, and the motion vector values of a control point is MVP ($v_{px}$, $v_{py}$). When distance offset and direction index are signaled, the motion vectors of current block's corresponding control points will be calculated as below.

$$MV(v_x,v_y)=MVP(v_{px},v_{py})+MV(\text{x-dir-factor}^*\text{distance-offset},\text{y-dir-factor}^*\text{distance-offset})$$

If the inter prediction is bi-directional, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is uni-directional, and the motion vector values of a control point on L0 is $MVP_{L0}$ ($v_{0px}$, $v_{0py}$), and the motion vector of that control point on L1 is $MVP_{L1}$ ($v_{1px}$, $v_{1py}$). When distance offset and direction index are signaled, the motion vectors of current block's corresponding control points will be calculated as below.

$$MV_{L0(v_{0x},v_{0y})}=MVP_{L0(v_{0px},v_{0py})}+MV(\text{x-dir-factor}^*\text{distance-offset},\text{y-dir-factor}^*\text{distance-offset})$$

$$MV_{L1(v_{0x},v_{0y})}=MVP_{L1(v_{0px},v_{0py})}+MV(-\text{x-dir-factor}^*\text{distance-offset},-\text{y-dir-factor}^*\text{distance-offset})$$

A simplified method is proposed to reduce the signaling overhead by signaling the distance offset index and the offset direction index per block. The same offset will be applied to all available control points in the same way. In this method, the number of control points is determined by the base predictor's affine type, 3 control points for 6-parameter type, and 2 control points for 4-parameter type.

Since the signaling is done for all the control points of the block at once, the zero_MVD flag is not used in this method.

11 Examples of Representation of Affine Motion Data

It is proposed that the affine parameters instead of CPMVs are stored to predict the affine model of following coded blocks.

12 Examples of Merge List Design

There are three different merge list construction processes supported in VVC:
(1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
(2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks.

In some embodiments, the uni-Prediction TPM merge list size is fixed to be 5.
(3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

12.1 Embodiments

In some embodiments, the ATMVP merge candidate in the normal merge list is moved to the first position of the affine merge list. Such that all the merge candidates in the new list (i.e., sub-block based merge candidate list) are based on sub-block coding tools.

An affine merge candidate list is constructed with following steps:
(1) Insert Inherited Affine Candidates Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

(2) Insert Constructed Affine Candidates

If the number of candidates in affine merge candidate list is less than MaxNumAffineCand (set to 5), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 7. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}

The available combination of motion information of CPs is only added to the affine merge list when the CPs have the same reference index.

(3) Padding with Zero Motion Vectors

If the number of candidates in affine merge candidate list is less than 5, zero motion vectors with zero reference indices are insert into the candidate list, until the list is full.

13 Drawbacks of Existing Methods for Combined Affine Merge Candidates

In some existing implementations, how to harmonize the affine prediction with other new coding tools such as inter-intra prediction, triangular prediction mode and UMVE (or MMVD) is still unclear.

14 Exemplary Methods for Harmonization of Affine Prediction with Other Coding Tools Embodiments of the disclosed technology enable the harmonization of affine prediction with other coding tools, which may control the bandwidth required by affine prediction in a more flexible way, and may further improve video coding efficiency and enhance both existing and future video coding standards is elucidated in the following examples, which should not be construed to be limiting, described for various implementations.

Although the following examples are described in the context of an "affine merge candidate list," the are equally applicable to other merge candidate lists, e.g. "sub-block merge candidate list" and when other kinds of sub-block merge candidate such as ATMVP candidate is also put into the merge candidate list.

EXAMPLES OF UMVE WITH AFFINE PREDICTION

Example 1. A flag is signaled for an affine merge coded block to indicate if the merged affine model should be further modified. The affine model may be defined by CPMVs or by affine parameters.
  (a) In one example, whether the flag is signaled or not depends on the width (w) and height (h) of the current block.
    (i) The flag is not signaled if w>Tw and h>Th. e.g. Tw=Th=32;
    (ii) The flag is not signaled if w>Tw or h>Th. e.g. Tw=Th=32;
    (iii) The flag is not signaled if w*h>Ts. e.g. Ts=1024;
    (iv) The flag is not signaled if w<Tw and h<Th. e.g. Tw=Th=16;
    (v) The flag is not signaled if w<Tw or h<Th. e.g. Tw=Th=16;
    (vi) The flag is not signaled if w*h<Ts. e.g. Ts=256;
  (b) In one example, the flag is coded with bypass coding;
  (c) In one example, the flag is coded with context model(s).
    (i) In one example, the flags of neighbouring blocks can be used to derive to which context model is used.
      (1) For example, suppose the flag of the above neighbouring block is flagA, the flag of the left neighbouring block is flagB, then flagA+flagB is used to indicate which context model is used.
      (2) If a neighbouring block is unavailable or not affine merge coded, the flag is regarded as zero.
  (d) In one example, the UMVE flag for regular merge mode is reused. Alternatively, the flag may be coded with context model based on the affine flag.

Example 2. If the merged affine model is indicted to be modified for an affine merge coded block, one or more modification index is signaled.
  (a) Alternatively, if the merged affine model is indicted to be modified for an affine merge coded block, one or more direction index and one or more distance index are signaled.
  (b) In one example, the modification index (or direction index, or distance index) is binarized as a fixed length code.
    (i) For example, the first K (e.g. K=0 or 1 or 2) bins of the fixed length code are coded with context model(s), and other bins are bypass coded.
  (c) In one example, the modification index (or direction index, or distance index) is binarized as a unary code.
    (i) For example, the first K (e.g. K=0 or 1 or 2) bins of the unary code are coded with context model(s), and other bins are bypass coded.
  (d) In one example, the modification index (or direction index, or distance index) is binarized as a truncated unary code.
    (i) For example, the first K (e.g. K=0 or 1 or 2) bins of the truncated unary code are coded with context model(s), and other bins are bypass coded.
  (e) In one example, the modification index (or direction index, or distance index) is binarized as an X-order Exp-Golomb (EGx) code. For example, x=0 or 1.
    (i) For example, the first K (e.g. K=0 or 1 or 2) bins of the EGx code are coded with context model(s), and other bins are bypass coded.
  (f) In one example, the modification index (or direction index, or distance index) is binarized as a truncated X-order Exp-Golomb (EGx) code. For example, x=0 or 1.
    (i) For example, the first K (e.g. K=0 or 1 or 2) bins of the truncated EGx code are coded with context model(s), and other bins are bypass coded.
  (g) In one example, the modification index (or direction index, or distance index) is binarized as a Rice code.
    (i) For example, the first K (e.g. K=0 or 1 or 2) bins of the Rice code are coded with context model(s), and other bins are bypass coded.
  (h) In one example, the modification index (or direction index, or distance index) is binarized as a truncated Rice code.
    (i) For example, the first K (e.g. K=0 or 1 or 2) bins of the truncated Rice code are coded with context model(s), and other bins are bypass coded.

Example 3. If the merged affine model is indicted to be modified for an affine merge coded block, then a CPMV (i.e. MV0, MV1 for 4-parameter affine model, MV0, MV1, MV2 for 6-parameter affine model) may be added with an offset (denoted as Off0=(Off0$x$, Off0$y$) for MV0, Off1=(Off1$x$, Off1y) for MV1 and Off2=(Off2x, Off2y) for MV2), derived from the signaled modification index, or the one or more direction index and one or more distance index.
- (a) In one example, Off0, Off1 and Off2 may not be the same.
  - (i) In one example, M modification indices (or M direction indices and M distance indices) are signaled to represent the M offsets for the M CPMVs, individually.
  - (ii) In one example, Off1+Off0 may be used as the offset of MV1, and Off2+Off0 may be used as the offset of MV2.
  - (iii) Alternatively, one modification index (or one direction index and one distance index) is signaled, and the offsets for CPMVs are derived from it. In one example, a look up table is used to derive the offsets.
- (b) In one example, Off1 and Off2 are always equal to zero. Off0 is derived from the modification index (or the direction index and distance index).
- (c) In one example, Off0 and Off2 are always equal to zero. Off1 is derived from the modification index (or the direction index and distance index).
- (d) In one example, Off0 and Off1 are always equal to zero. Off2 is derived from the modification index (or the direction index and distance index), for 6-parameter affine model.
- (e) The derivation of the offsets may depend on the width and height of the current block.
- (f) In one example, an index may be signaled to indicate which CPMV(s) is (are) modified.
- (g) In one example, an index may be signaled for each CU/PU/block to indicate how may modification indices will be signaled if more than one modification indices are allowed.
- (h) In one example, only one modification index is allowed, however, an index may be signaled to indicate which control point uses such modification index.
- (i) In one example, how many modification indices are signaled may depend on the block size or affine type.
  - (1) In one example, only one modification index is allowed for block size smaller than MxN, for example M=N=16.
  - (2) In one example, only one modification index is allowed for 4-parameter affine model.
  - (3) In one example, only one or two modification indices are allowed for 6-parameter affine model.

Example 4. If the merged affine model is indicted to be modified for an affine merge coded block, then a parameter (e.g., a, b, e, f for 4-parameter affine model, a, b, c, d, e, f for 6-parameter affine model) is added with an offset (denoted as Offa for a, Offb for b, Offc for c, Offd for d, Offe for e and Offf for f), derived from the signaled modification index, or one or more sign flag and one or more distance index.
- (a) In one example, Offa, Offb, Offc, Offd, Offe and Offf may be the same or may not be the same.
  - (i) In one example, M modification indices (or M sign flags and M distance indices) are signaled to represent the M offsets for the M parameters, individually.
  - (ii) Alternatively, one modification index (or one sign flag and one distance index) is signaled, and the offsets for parameters are derived from it. In one example, a look up table is used to derive the offsets.
- (b) In one example, Offe and Offf are always equal to zero. Offa and Offb are derived from the modification index (or the sign flag and distance index) for the 4-parameter affine model.
- (c) In one example, Offe and Offf are always equal to zero. Offa, Offb, Offc and Offd are derived from the modification index (or the sign flag and distance index) for the 6-parameter affine model.

Example 5. If the merged affine model is indicted to be modified for an affine merge coded block, then a parameter (i.e. a, b for 4-parameter affine model, a, b, c, d for 6-parameter affine model) may be added with an offset (denoted as Offa for a, Offb for b, Offc for c, Offd for d), derived from the signaled modification index, or one or more sign flag and one or more distance index. And a CPMV (i.e. MV0, MV1 for 4-parameter affine model, MV0, MV1, MV2 for 6-parameter affine model) is added with an offset (denoted as Off0=(Off0x, Off0y) for MV0, Off1, (Off1x, Off1y) for MV1 and Off2=(Off2x, Off2y) for MV2), derived from the signaled modification index, or the one or more direction index and one or more distance index.
- (a) In one example, Off0, Offa and Offb are derived from the modification index (or the sign flag, the direction index and distance index) for the 4-parameter affine model.
- (b) In one example, Off0, Offa, Offb, Offc and Offd are derived from the modification index (or the sign flag, the direction index and distance index) for the 6-parameter affine model.

Examples of Inter-Intra Prediction with Affine Prediction

Example 6. It is proposed that inter-intra prediction may be applied to a block coded with sub-block technologies.
- (a) In one example, the sub-block merge technology may be affine, ATMVP, Planar merge mode or a STMVP.
- (b) In one example, an inter-intra prediction flag is signaled when the current block is affine merge coded.
  - (i) Alternatively, inter-intra prediction flag is signaled when the current block is affine merge coded and the sub-block merge index is larger than T. (e.g. T=3).
  - (ii) Alternatively, inter-intra prediction flag is signaled when the current block is affine merge coded and the selected sub-block merge index is smaller than T. (e.g. T=3).
- (c) When inter-intra prediction is applied to a block coded with sub-block sub-block technologies, the intra-prediction and sub-block based inter-prediction are both conducted to the current block, and these two predictions are weighted summed to obtain the final prediction for the current block.

Example 7. It is proposed that inter-intra prediction may be applied to MMVD or UMVE coded blocks.

Examples of Triangular Prediction Mode with Affine Prediction

Figure 15:
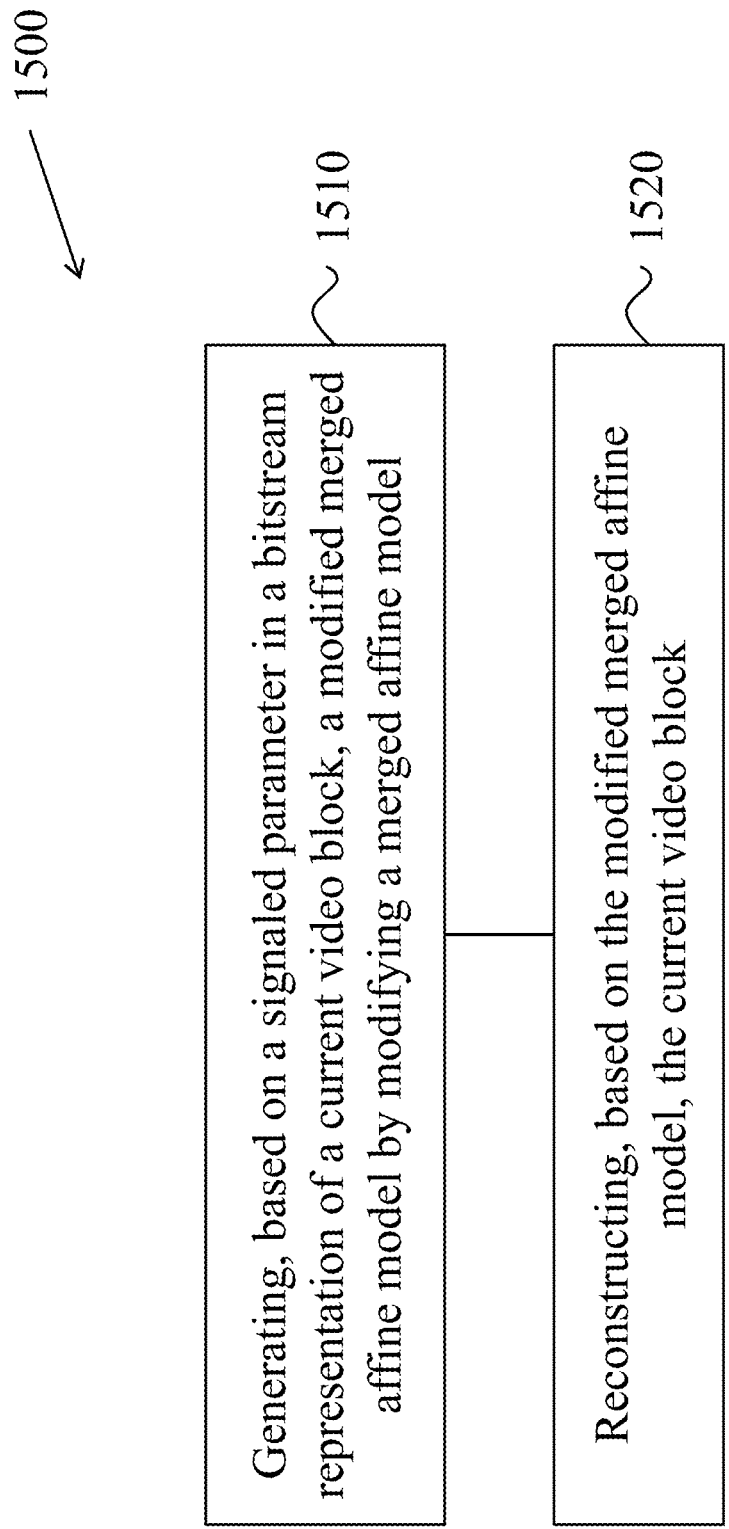
FIG. 15 shows a flowchart of an example method for video processing in accordance with the disclosed technology.

Example 8. It is proposed that triangular prediction can be applied with at least one sub-block merge candidates.
- (a) In one example, one prediction is generated by sub-block based inter-prediction from a sub-block merge candidate, such as an affine merge candidate. The other prediction is generated by normal inter-prediction from a normal merge candidate. Then the two predictions are weighted summed as shown in FIG. 15.
- (b) In one example, two predictions are generated by sub-block based inter-prediction from one or two sub-block merge candidates, such as an affine merge candidate. Then the two predictions are weighted summed as shown in FIG. 15.

Examples of Triangular Prediction Mode with Inter-Intra Prediction

Example 9. It is proposed that inter-intra prediction can be combined with the triangular prediction mode.
  (a) In one example, the triangular prediction is generated, and intra-prediction is generated, and the two predictions are weighted summed to get the final prediction.

The examples described above may be incorporated in the context of the methods described below, e.g., methods 1500, 1600 and 1700, which may be implemented at a video decoder and/or a video encoder.

FIG. 15 shows a flowchart of an exemplary method for video coding. The method 1500 includes, at step 1510, generating, based on a signaled parameter in a bitstream representation of a current video block, a modified merged affine model by modifying a merged affine model. In some embodiments, modifying the merged affine model includes modifying at least one control point motion vector (CPMV) of an affine model for the current video block, or changing one or more control points of the affine model, or switching the affine model between four parameters and six parameters.

The method 1500 includes, at step 1520, reconstructing, based on the modified merged affine model, the current video block.

In some embodiments, and in the context of Example 1, the signaled parameter comprises a flag. In an example, the flag is based on a height (h) or a width (w) of the current video block. For example, h≤Th and/or w≤Tw, wherein Th and Tw are integers, and Th=Tw and Th=16 or 32. In another example, w×h<Ts, wherein Ts is an integer equal to 1024 or 256. In yet another example, flag is coded with bypass coding. In yet another example, the flag is coded with one or more context models. For example, the one or more context models is based on flags of one or more neighboring blocks of the current video block, or the flag corresponds to a ultimate motion vector expression (UMVE) flag for a regular merge mode.

In some embodiments, and in the context of Example 2, the signaled parameter comprises at least one of a modification index, a direction index or a distance index. In an example, the signaled parameter is binarized as a code. In another example, the code is a fixed length code, a unary code, a truncated unary code, an X-order Exp-Golomb (EGx) code, a truncated X-order Exp-Golomb (EGx) code, a Rice code or a truncated Rice code. In yet another example, a first number of bins of the code are coded with a context model and a remaining number of bins of the code are bypass coded.

In some embodiments, and in the context of Example 3, a derivation of one or more offsets for a control point motion vector (CPMV) is based on the signaled parameter, and wherein the modifying the merged affine model is based on the CPMV or the one or more offsets. In an example, the signaled parameter comprises one or more modification indexes, one or more direction indexes or one or more distance indexes that represent a corresponding each of the one or more offsets. In another example, the derivation of the one or more offsets is based on a single modification index, a single direction index or a single distance index. In yet another example, the derivation of the one or more offsets is further based on a height or a width of the current video block.

In some embodiments, and in the context of Example 3, a number of the at least one of the modification index, the direction index or the distance index is based on a size or an affine model type of the current video block. In an example, the size of the current video block is less than M×N, where the number of the at least one of the modification index is one, and where M=N=16. In another example, the affine model type is a 4-parameter affine model, and wherein the number of the at least one of the modification index is one. In yet another example, the affine model type is a 6-parameter affine model, and wherein the number of the at least one of the modification index is one or two.

Figure 16:
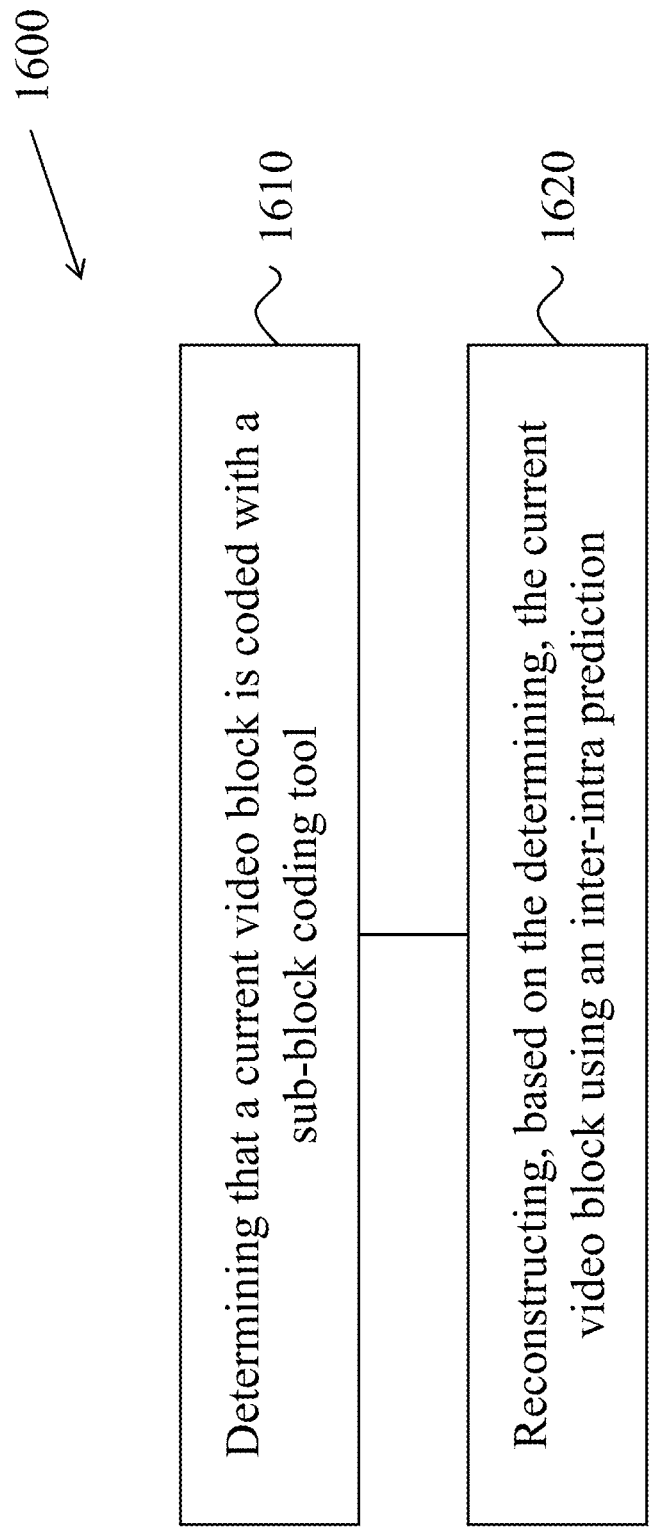
FIG. 16 shows a flowchart of another example method for video processing in accordance with the disclosed technology.

FIG. 16 shows a flowchart of an exemplary method for video coding. The method 1600 includes, at step 1610, determining that a current video block is coded with a sub-block coding tool. In some embodiments, and in the context of Example 6, the sub-block coding tool comprises an affine prediction mode, an alternative temporal motion vector prediction (ATMVP) mode, a planar merge mode or a spatial-temporal motion vector prediction (STMVP) mode.

The method 1600 includes, at step 1620, reconstructing, based on the determining, the current video block using an inter-intra prediction. In some embodiments, and in the context of Example 6, the reconstructing is further based on an inter-intra prediction flag signaled in a bitstream representation of the current video block. In an example, the current video block is affine merge coded. In another example, the reconstructing is further based on a final prediction for the current video block, and the final prediction is a weighted sum of the inter-intra prediction and a prediction based on the sub-block coding tool. In some embodiments, and in the context of Example 7, the current video block is coded using UMVE.

Figure 17:
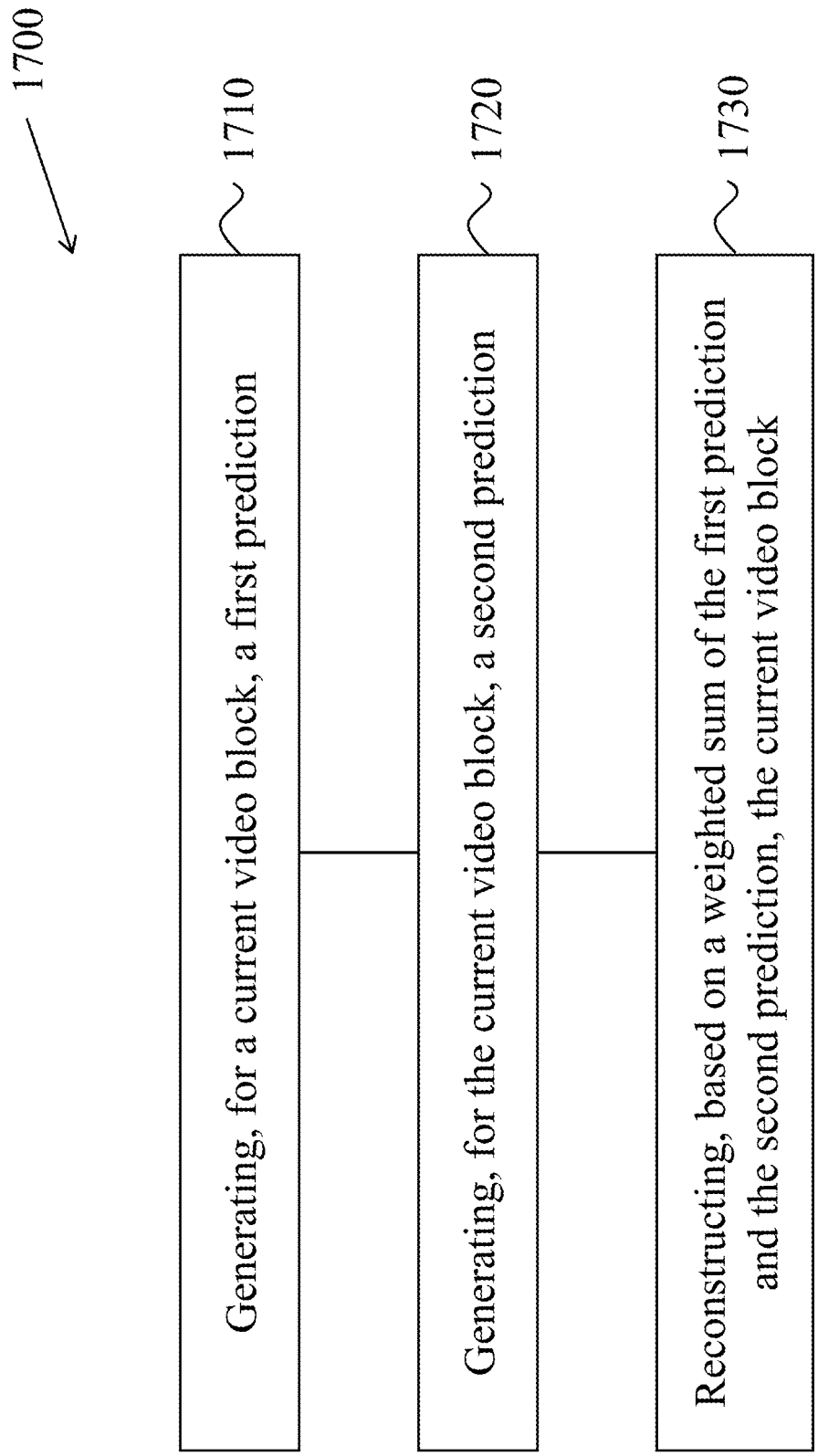
FIG. 17 shows a flowchart of yet another example method for video processing in accordance with the disclosed technology.

FIG. 17 shows a flowchart of an exemplary method for video coding. The method 1700 includes, at step 1710, generating, for a current video block, a first prediction.

The method 1700 includes, at step 1720, generating, for the current video block, a second prediction. In some embodiments, and in the context of Example 8, the first prediction is based on a sub-block based inter-prediction from a sub-block merge candidate, and wherein the second prediction is based on a normal inter-prediction from a normal merge candidate. In an example, the first prediction is an affine merge prediction.

In some embodiments, and in the context of Example 8, the first prediction is based on a first sub-block based inter-prediction, and wherein the second prediction is based on a second sub-block based inter-prediction. In an example, the first prediction or the second prediction is an affine merge prediction.

In some embodiments, and in the context of Example 9, the first prediction is a triangular prediction, and wherein the second prediction is an inter-intra prediction.

The method 1700 includes, at step 1730, reconstructing, based on a weighted sum of the first prediction and the second prediction, the current video block.

In some embodiments, the methods 1500, 1600 and 1700 may further include the step of reconstructing or decoding other video blocks in a same picture as the current video block.

15 Example Implementations of the Disclosed Technology

Figure 18:
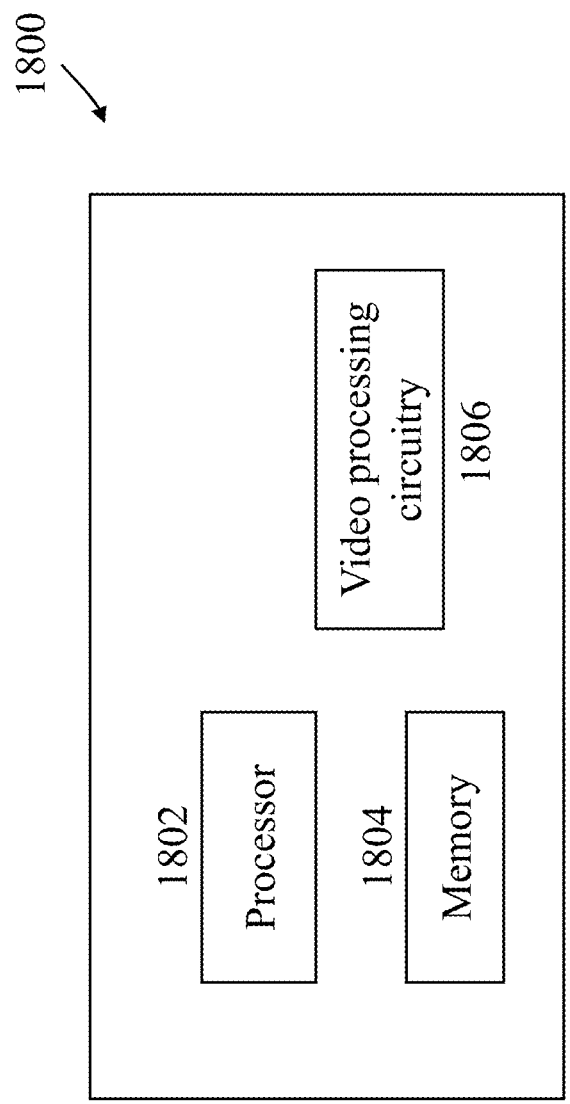
FIG. 18 is a block diagram of an example of a hardware platform for implementing a video decoding or a video encoding technique described in the present document.

FIG. 18 is a block diagram of a video processing apparatus 1800. The apparatus 1800 may be used to implement one or more of the methods described herein. The apparatus 1800 may be embodied in a smartphone, tablet, computer, Internet of Things (IoT) receiver, and so on. The apparatus 1800 may include one or more processors 1802, one or more memories 1804 and video processing hardware 1806. The processor(s) 1802 may be configured to implement one or more methods (including, but not limited to, methods 1500, 1600 and 1700) described in the present document. The memory (memories) 1804 may be used for storing data and code used for implementing the methods and techniques described herein. The video processing hardware 1806 may be used to implement, in hardware circuitry, some techniques described in the present document.

Figure 19:
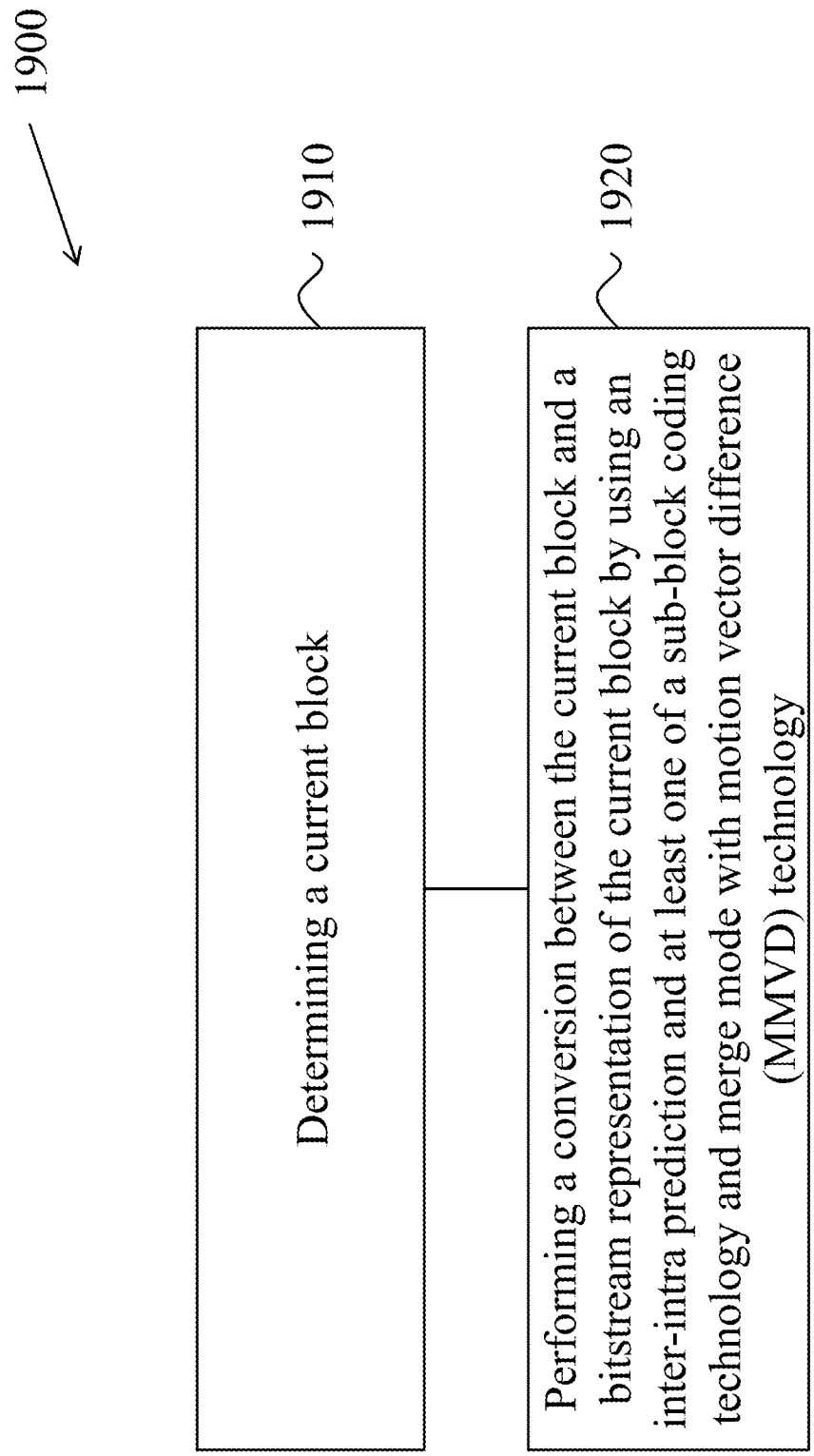
FIG. 19 shows a flowchart of an example method for video processing in accordance with the disclosed technology.

FIG. 19 shows a flowchart of an exemplary method for video coding. The method 1900 includes, at step 1910, determining a current block; at step 1920, performing a conversion between the current block and a bitstream representation of the current block by using an inter-intra prediction and at least one of a sub-block coding technology and merge mode with motion vector difference (MMVD) technology.

Figure 20:
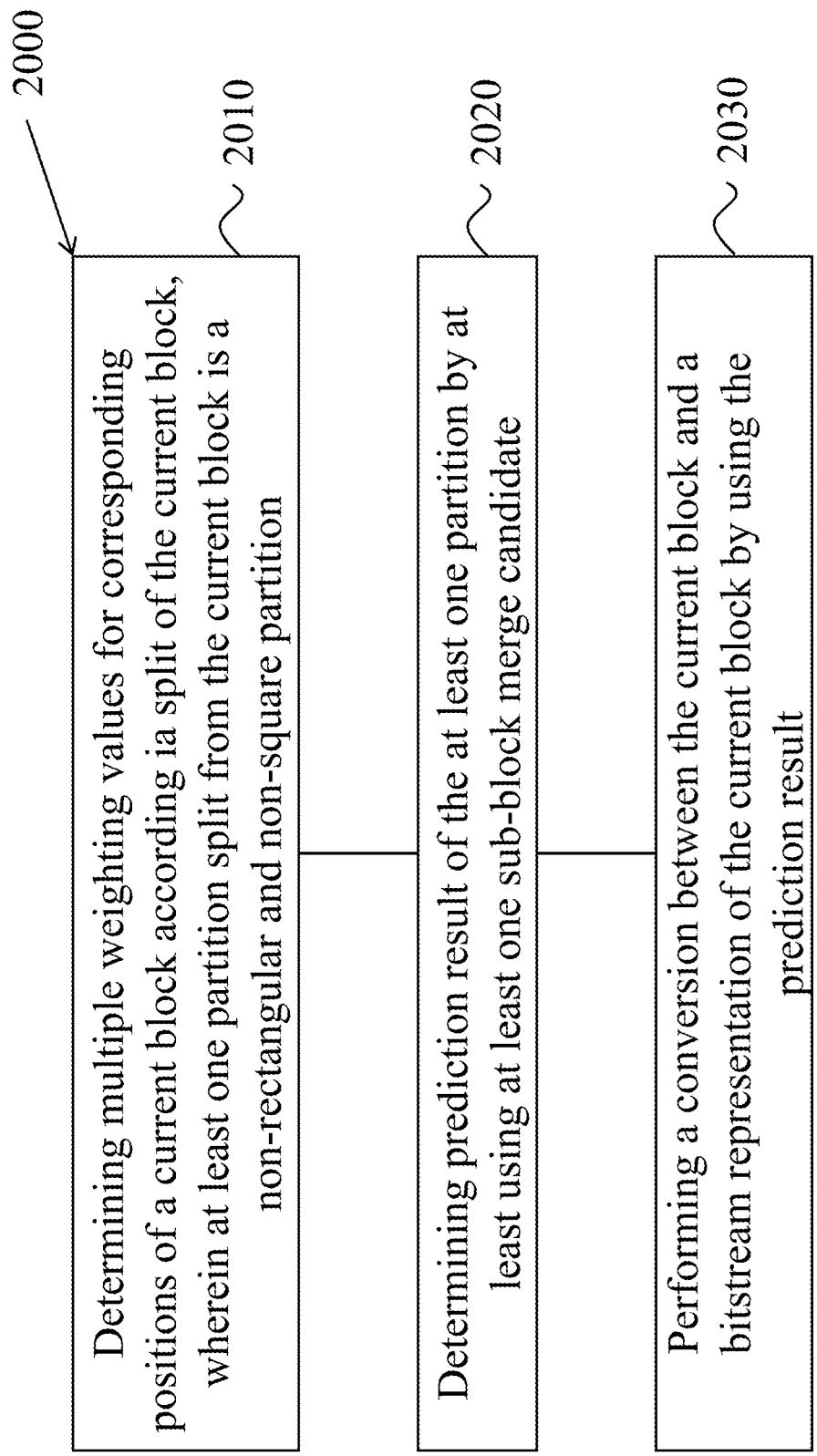
FIG. 20 shows a flowchart of an example method for video processing in accordance with the disclosed technology.

FIG. 20 shows a flowchart of an exemplary method for video coding. The method 2000 includes, at step 2010, determining multiple weighting values for corresponding positions of a current block according a split of the current block, wherein at least one partition split from the current block is a non-rectangular and non-square partition; at step 2020, determining prediction result of the at least one partition by at least using at least one sub-block merge candidate; at step 2030, performing a conversion between the current block and a bitstream representation of the current block by using the prediction result.

Figure 21:
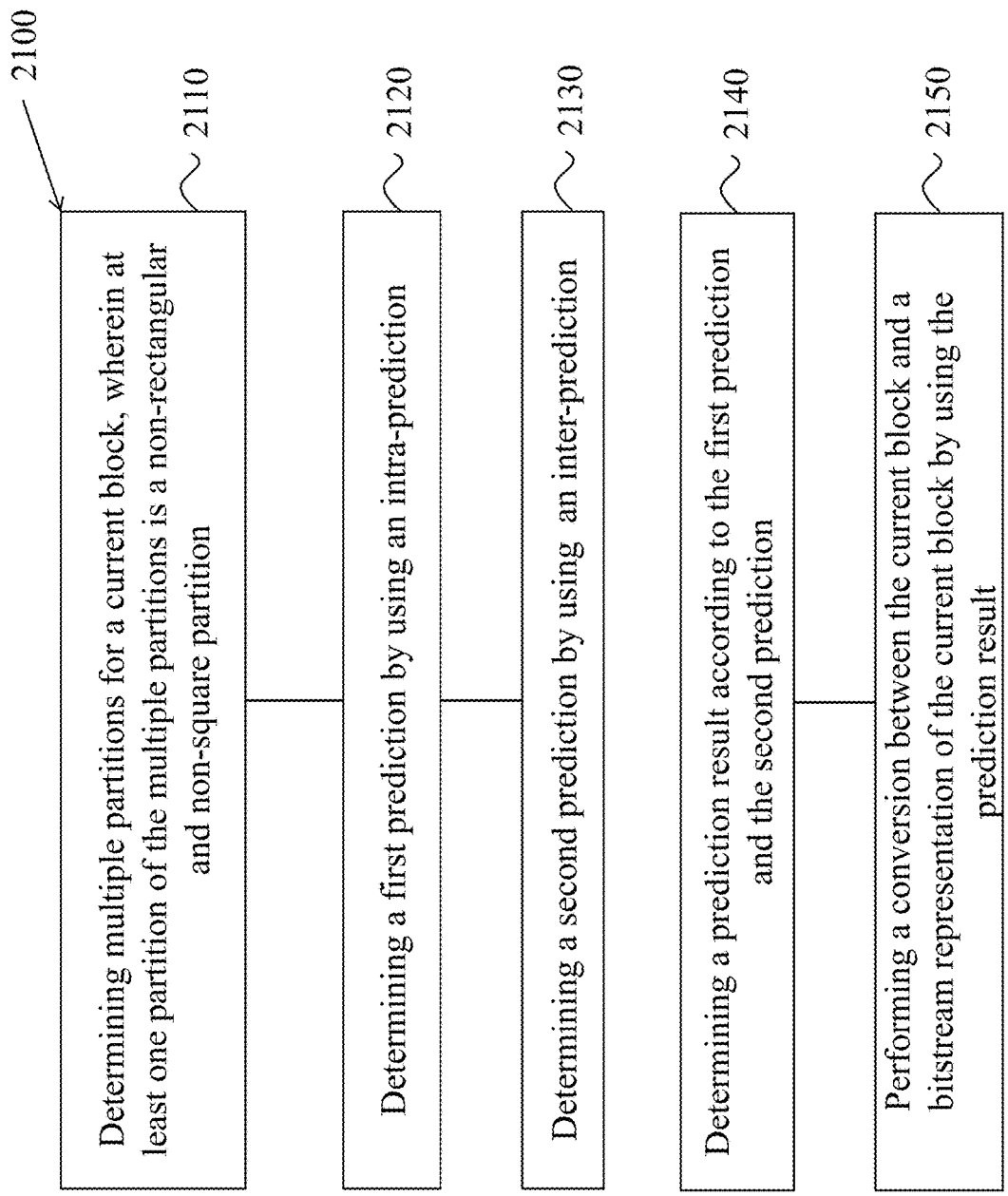
FIG. 21 shows a flowchart of an example method for video processing in accordance with the disclosed technology.
Figure 22:
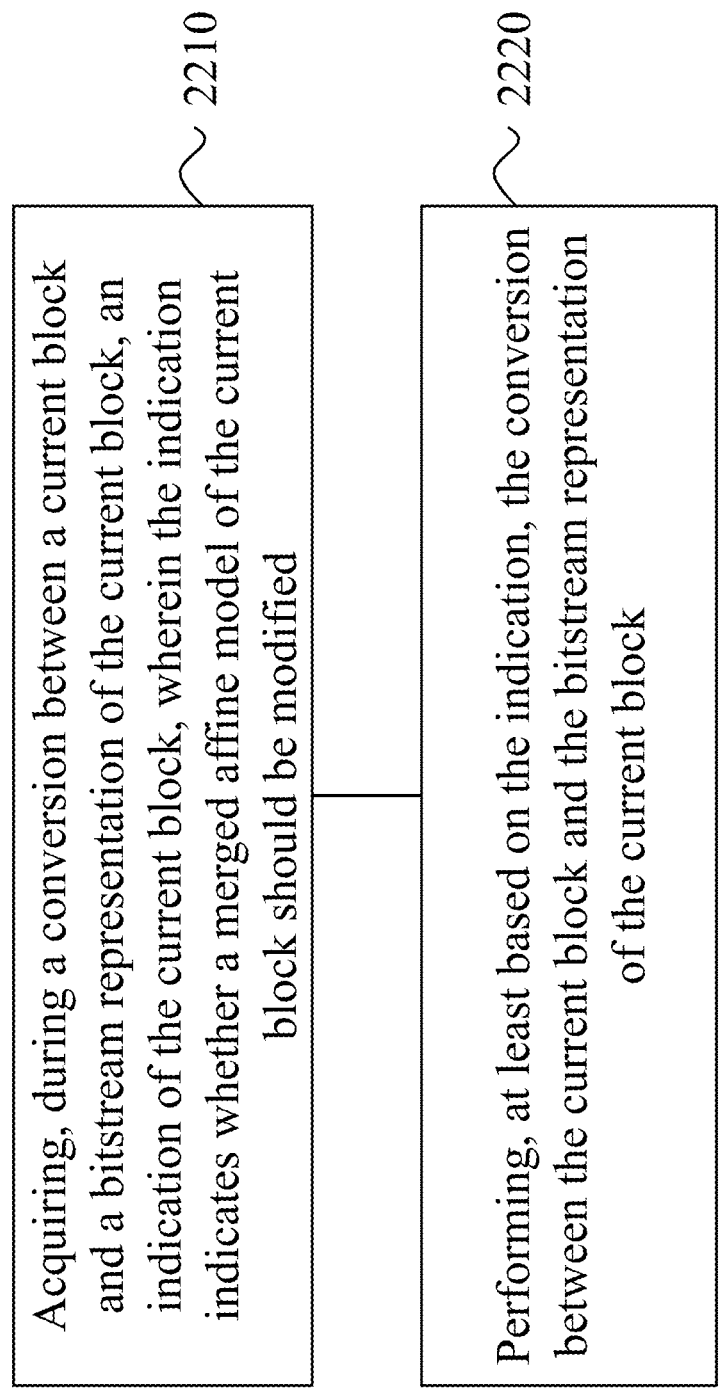
FIG. 22 shows a flowchart of an example method for video processing in accordance with the disclosed technology.

FIG. 21 shows a flowchart of an exemplary method for video coding. The method 2000 includes, at step 2110, determining multiple partitions for a current block, wherein at least one partition of the multiple partitions is a non-rectangular and non-square partition; at step 2120, determining a first prediction by using an intra-prediction; at step 2130, determining a second prediction by using an inter-prediction; at step 2140, determining a prediction result according to the first prediction and the second prediction; and at step 2150, performing a conversion between the current block and a bitstream representation of the current block by using the prediction result. acquiring, during a conversion between a current block and a bitstream representation of the current block, an indication of the current block, wherein the indication indicates whether a merged affine model of the current block should be modified; and FIG. 22 shows a flowchart of an exemplary method for video coding. The method 2200 includes, at step 2210, acquiring, during a conversion between a current block and a bitstream representation of the current block, an indication of the current block, wherein the indication indicates whether a merged affine model of the current block should be modified; at step 2220, performing, at least based on the indication, the conversion between the current block and the bitstream representation of the current block.

Some features preferably implemented by some embodiments are now disclosed in clause-based format.

1. A method for video processing, comprising:
   determining a current block; and
   performing a conversion between the current block and a bitstream representation of the current block by using an inter-intra prediction and at least one of a sub-block coding technology and merge mode with motion vector difference (MMVD) technology.

2. The method of clause 1, wherein the sub-block coding technology comprises at least one of an affine prediction mode, a sub-block-based alternative temporal motion vector prediction (ATMVP) mode, a planar merge mode and a spatial-temporal motion vector prediction (STMVP) mode.

3. The method of clause 1 or 2, wherein an inter-intra prediction flag is signaled in response to determining the current block being coded with an affine merge prediction mode.

4. The method of any of clauses 1-3, wherein an inter-intra prediction flag is signaled in response to determining the current block being coded with an affine merge prediction mode and a sub-block merge index of the current block being larger than a first threshold.

5. The method of any of clauses 1-3, wherein an inter-intra prediction flag is signaled in response to determining the current block being coded with an affine merge prediction mode and a selected sub-block merge index of the current block being smaller than a second threshold.

6. The method of clause 4 or 5, wherein the first threshold and the second threshold are 3.

7. The method of anyone of clauses 1-6, wherein performing a conversion between the current block and a bitstream representation of the current block by using an inter-intra prediction and at least one of a sub-block coding technology and merge mode with motion vector difference (MMVD) technology comprises:
   performing a first prediction on the current block by using an intra-prediction to obtain a first prediction result;
   performing a second prediction on the current block by using a sub-block based inter-prediction to obtain a second prediction result;
   performing a weighted sum on the first prediction result and the second prediction result to obtain a final prediction result;
   performing, based on the final prediction result, the conversion between the current block and the bitstream representation of the current block.

8. A method for video processing, comprising:
   determining multiple weighting values for corresponding positions of a current block according a split of the current block, wherein at least one partition split from the current block is a non-rectangular and non-square partition;
   determining prediction result of the at least one partition by at least using at least one sub-block merge candidate; and
   performing a conversion between the current block and a bitstream representation of the current block by using the prediction result.

9. The method of clause 8, wherein determining prediction result of the at least one partition by at least using at least one sub-block merge candidate comprises:
   performing a first prediction on the current block by using a sub-block based inter-prediction to obtain a first prediction result from a sub-block merge candidate;
   performing a second prediction on the current block by using a inter-prediction to obtain a second prediction result from a merge candidate;
   performing a weighted sum on the first prediction result and the second prediction result according to the multiple weighting values to obtain the prediction result.

10. The method of clause 8, wherein determining prediction result of the at least one partition by at least using at least one sub-block merge candidate comprises:
   performing a first prediction on the current block by using a sub-block based inter-prediction to obtain two first prediction results from one or two sub-block merge candidates;
   performing a weighted sum on the two first prediction results according to the multiple weighting values to obtain the prediction result.

11. The method of clauses 9 or 10, wherein the current block is split into two triangles.

12. A method for video processing, comprising:
determining multiple partitions for a current block, wherein at least one partition of the multiple partitions is a non-rectangular and non-square partition;
determining a first prediction by using an intra-prediction;
determining a second prediction by using an inter-prediction;
determining a prediction result according to the first prediction and the second prediction, and
performing a conversion between the current block and a bitstream representation of the current block by using the prediction result.

13. The method of clause 12, wherein
the first prediction on the current block by using the intra-prediction is performed to obtain a first prediction result;
the second prediction on the current block by using the inter-prediction is performed to obtain a second prediction result from a merge candidate according to the partitions;
a weighted sum on the first prediction result and the second prediction result is performed to obtain the prediction result.

14. The method of anyone of clauses 12 or 13, wherein the current block is split into two triangles.

15. A video processing apparatus comprising a processor configured to implement a method recited in anyone of clauses 1 to 14.

16. The apparatus of clause 15, wherein the apparatus is a video encoder.

17. The apparatus of clause 15, wherein the apparatus is a video decoder.

18. A computer readable recoding media on which a program comprising code is recorded, the program is for a processor to carry out a method recited in anyone of clauses 1 to 17.

Some features preferably implemented by some other embodiments are now disclosed in clause-based format.

1. A method for video processing, comprising:
acquiring, during a conversion between a current block and a bitstream representation of the current block, an indication of the current block, wherein the indication indicates whether a merged affine model of the current block should be modified; and
performing, at least based on the indication, the conversion between the current block and the bitstream representation of the current block.

2. The method of clause 1, wherein modifying the merged affine model comprises at least one of:
modifying at least one control point motion vector (CPMV) of an affine model for the current block,
changing one or more control points of an affine model for the current block,
modifying at least one affine parameter of an affine model for the current block, and
switching an affine model for the current block between four affine parameters and six affine parameters.

3. The method of clause 1 or 2, wherein whether the indication is signaled or not is based on a height (h) and/or a width (w) of the current block.

4. The method of clause 3, wherein the indication is signaled in response to h≤Th1 and w≤Tw1, wherein Th1 and Tw1 are integers.

5. The method of clause 3, wherein the indication is signaled in response to h≤Th1 or w≤Tw1, wherein Th1 and Tw1 are integers.

6. The method of clause 4 or 5, wherein Th1=Tw1=32.

7. The method of clause 3, wherein the indication is signaled in response w×h<Ts1, wherein Ts1 is an integer.

8. The method of clause 7, wherein Ts1=1024.

9. The method of clause 3, wherein the indication is signaled in response to h≥Th2 and w≥Tw2, wherein Th2 and Tw2 are integers.

10. The method of clause 3, wherein the indication is signaled in response to h≥Th2 or w≥Tw2, wherein Th2 and Tw2 are integers.

11. The method of clause 9 or 10, wherein Th2=Tw2=16.

12. The method of clause 3, wherein the indication is signaled in response w×h>Ts2, wherein Ts2 is an integer.

13. The method of clause 12, wherein Ts2=256.

14. The method of anyone of clauses 1-13, wherein the indication is coded with bypass coding.

15. The method of anyone of clauses 1-13, wherein the indication is coded with one or more context models.

16. The method of clause 15, wherein the one or more context models are derived based on neighboring indications of one or more neighboring blocks of the current block.

17. The method of clause 16, wherein the one or more context models are derived based on a sum of a first neighboring indication of a left neighboring block and a second neighboring indication of an above neighboring block.

18. The method of anyone of clauses 1-17, wherein a merge mode with motion vector difference (MMVD) flag for a regular merge mode is used as the indication.

19. The method of clause 18, wherein the MMVD flag is coded with a context model based on an affine flag.

20. The method of anyone of clauses 1-19, wherein at least one index (the index may be the first index or second index below) is signaled in response to the indication indicating that a merged affine model of the current block should be modified.

21. The method of clause 20, wherein the at least one index comprises one or more modification indices.

22. The method of clause 20, wherein the index comprises at least one of a direction index and a distance index.

23. The method of anyone of clauses 20-22, wherein the index is a combination of a direction index and a distance index.

24. The method of anyone of clauses 20-23, wherein part or all of the at least one index is binarized as a code.

25. The method of clause 24, wherein the code is anyone of a fixed length code, a unary code, a truncated unary code, an X-order Exp-Golomb (EGx) code, a truncated X-order Exp-Golomb (EGx) code, a Rice code or a truncated Rice code.

26. The method of clause 24 or 25, wherein a first number of bins of the code are coded with a context model and a remaining number of bins of the code are bypass coded.

27. The method of anyone of clauses 1-26, wherein a control point motion vector (CPMV) of the current block is added with an offset.

28. The method of clause 27, wherein at least one first index for deriving the offset is signaled in the bitstream representation in response to the indication indicating that a merged affine model of the current block should be modified.

29. The method of clause 28, wherein the offsets for the different CPMVs are different from each other.

30. The method of clause 28 or 29, wherein one or more first indices of the at least one index is used to derive one or more offsets for the corresponding one or more of CPMVs respectively.

31. The method of any one of clauses 28-30, wherein the offset corresponding to the top-right CPMV is a sum of the offset corresponding to the top-left CPMV and a difference signaled by the first index.

32. The method of any one of clauses 28-30, wherein the offset corresponding to the bottom-left CPMV is a sum of the offset corresponding to the top-left CPMV and a difference signaled by the first index.

33. The method of clause 28 or 29, wherein one or more first indices of the at least one first index is used to derive one or more offsets of corresponding one or more of CPMVs and the one or more offsets are further used to derive other offset of other CMVPs.

34. The method of anyone of clauses 28-33, wherein a third indication is signaled to indicate a number of the first indices to be signaled.

35. The method of anyone of clauses 28-34, wherein a fourth indication is signaled to indicate a control point (CP) using the first index.

36. The method of anyone of clauses 28-35, wherein a number of first index to be signaled is based on a size or an affine mode of the current block.

37. The method of anyone of clauses 27-36, wherein a table is used to derive one or more offsets for corresponding one or more of CPMVs.

38. The method of anyone of clauses 27-37, wherein two offsets for two CPMVs are zero and an offset for a third CPMV is derived from the at least one index.

39. The method of anyone of clauses 27-38, wherein the one or more offsets are based on a height and/or a width of the current block.

40. The method of anyone of clauses 27-39, wherein a second indication is signaled to indicate one or more CPMVs to be modified.

41. The method of clause 40, wherein one first index is to be signaled when the size of the current block is smaller than M×N.

42. The method of clause 41, wherein M=N=16.

43. The method of anyone of clauses 40-42 wherein one first index is to be signaled when the affine model of the current block is a 4-parameter affine mode.

44. The method of anyone of clauses 40-43, wherein one or two modification indices are to be signaled when the affine model of the current block is a 6-parameter affine mode.

45. The method of anyone of clauses 1-44, wherein an affine parameter of the current block is added with an offset.

46. The method of clause 45, wherein the offsets for different affine parameters are different from each other.

47. The method of clause 45, wherein the offsets for at least two affine parameters are the same.

48. The method of anyone of clause 45-47, wherein at least one second index for deriving the offset is signaled in the bitstream representation in response to the indication indicating that a merged affine model of the current block should be modified.

49. The method of clause 48, wherein the at least one second index comprises one or more modification index.

50. The method of clause 48, wherein the at least one index comprises at least one of a sign flag and a distance index.

51. The method of clauses 48, wherein the second index is a combination of a sign flag and a distance index.

52. The method of any of clauses 48-51, wherein one or more second indices of the at least one second index is used to derive one or more offsets for corresponding one or more of affine parameters respectively.

53. The method of any of clauses 48-52, wherein one or more second indices of the at least one second index is used to derive one or more offsets of corresponding one or more of affine parameters and the one or more offsets are further used to derive other offsets of other affine parameters.

54. The method of anyone of clauses 45-53, wherein one or more of the offsets for the corresponding one or more affine parameters are derived from a lookup table.

55. The method of anyone of clauses 45-54, wherein two offsets for affine parameters e and f are zero and the at least one second index are used to derive one or more of the offsets for the other affine parameters.

56. The method of anyone of clauses 1-55, wherein a CPMV of the current block is added with an offset which is indicated by one or more of a modification index, a direction index and a distance index and an affine parameter of the current block is added with an offset which is indicated by one or more of a modification index, a sign flag and a distance index in response to the indication indicating that a merged affine model of the current block should be modified.

57. The method of clause 56, wherein the top-left CPMV is added with an offset derived from one or more of the modification index, the direction index and distance index.

58. The method of clause 56 or 57, wherein at least one of the affine parameters a, b, c and d is added with an offset derived from one or more of the modification index, sign flag and distance index.

59. A video processing apparatus comprising a processor configured to implement a method recited in anyone of clauses 1 to 58.

60. The apparatus of clause 59, wherein the apparatus is a video encoder.

61. The apparatus of clause 59, wherein the apparatus is a video decoder.

62. A computer readable recoding media on which a program comprising code is recorded, the program is for a processor to carry out a method recited in anyone of clause 1 to 58.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a current block of a video and a bitstream of the video, whether an indication of the current block is included in the bitstream according to a rule, wherein the indication indicates whether a merged affine model of the current block should be modified, and the rule specific that the indication is not included in the bitstream in a case that a width of the current block is smaller than a first predetermined value or a height of the current block is smaller than a second predetermined value; and
   performing the conversion at least based on the indication;
   wherein modifying the merged affine model comprises at least one of:
      modifying at least one control point motion vector (CPMV) of the merged affine model;
      modifying at least one affine parameter of the merged affine model; and
      switching the merged affine model between four affine parameters and six affine parameters, and
   wherein at least one index is included in the bitstream in a case that the indication indicates that the merged affine model of the current block should be modified.

2. The method of claim 1, wherein the first predetermined value is equal to 16.

3. The method of claim 1, wherein the second predetermined value is equal to 16.

4. The method of claim 1, wherein the indication is coded with context model.

5. The method of claim 1, wherein the at least one index comprises at least one of a direction index and a distance index.

6. The method of claim 5, wherein the direction index is binarized as a fixed length code.

7. The method of claim 6, wherein a first K bins of the fixed length code are coded with a context model.

8. The method of claim 7, wherein the K is equal to 2.

9. The method of claim 5, wherein the distance index is binarized as a truncated unary code.

10. The method of claim 9, wherein a first K bins of the truncated unary code are coded with a context model and a remaining bins of the truncated unary code are bypass coded, and the K is equal to 1.

11. The method of claim 1, wherein a control point motion vector (CPMV) of the current block is added with an offset in a case that the indication is included in the bitstream.

12. The method of claim 11, wherein at least one modification index for deriving the offset is included in the bitstream in a case that the indication indicates that the merged affine model of the current block should be modified.

13. The method of claim 12, wherein M modification indexes are included in the bitstream, and wherein the M modification indexes are representing M offsets for M CPMVs respectively, and M is an integer.

14. The method of claim 11, wherein the offset is derived based on a lookup table.

15. The method of claim 1, wherein the conversion includes encoding the current block into the bitstream.

16. The method of claim 1, wherein the conversion includes decoding the current block from the bitstream.

17. An apparatus for processing video data comprising a processor and a non-transitory memory with instructions thereon, wherein the instructions upon execution by the processor, cause the processor to:
determine, for a conversion between a current block of a video and a bitstream of the video, whether an indication of the current block is included in the bitstream according to a rule, wherein the indication indicates whether a merged affine model of the current block should be modified, and the rule specific that the indication is not included in the bitstream in a case that a width of the current block is smaller than a first predetermined value or a height of the current block is smaller than a second predetermined value; and
perform the conversion at least based on the indication;
wherein modify the merged affine model comprises at least one of:
modify at least one control point motion vector (CPMV) of the merged affine model;
modifying at least one affine parameter of the merged affine model; and
switch the merged affine model between four affine parameters and six affine parameters, and
wherein at least one index is included in the bitstream in a case that the indication indicates that the merged affine model of the current block should be modified.

18. A non-transitory computer-readable storage medium storing instructions that cause a processor to:
determine, for a conversion between a current block of a video and a bitstream of the video, whether an indication of the current block is included in the bitstream according to a rule, wherein the indication indicates whether a merged affine model of the current block should be modified, and the rule specific that the indication is not included in the bitstream in a case that a width of the current block is smaller than a first predetermined value or a height of the current block is smaller than a second predetermined value; and
perform the conversion at least based on the indication;
wherein modify the merged affine model comprises at least one of:
modify at least one control point motion vector (CPMV) of the merged affine model;
modifying at least one affine parameter of the merged affine model; and
switch the merged affine model between four affine parameters and six affine parameters, and
wherein at least one index is included in the bitstream in a case that the indication indicates that the merged affine model of the current block should be modified.

19. A non-transitory computer-readable recording medium storing a bitstream of a video which is generated by a method performed by a video processing apparatus, wherein the method comprises:
determining, whether an indication of a current block of the video is included in the bitstream according to a rule, wherein the indication indicates whether a merged affine model of the current block should be modified, and the rule specific that the indication is not included in the bitstream in a case that a width of the current block is smaller than a first predetermined value or a height of the current block is smaller than a second predetermined value; and
generating the bitstream based on the indication;
wherein modifying the merged affine model comprises at least one of:
modifying at least one control point motion vector (CPMV) of the merged affine model;
modifying at least one affine parameter of the merged affine model; and
switching the merged affine model between four affine parameters and six affine parameters, and
wherein at least one index is included in the bitstream in a case that the indication indicates that the merged affine model of the current block should be modified.

* * * * *